(12) United States Patent
Kumazawa et al.

(10) Patent No.: US 6,704,495 B1
(45) Date of Patent: Mar. 9, 2004

(54) AUDIO-VIDEO DEVICE REPRODUCING APPARATUS

(75) Inventors: Takaaki Kumazawa, Mie (JP); Genichi Yamada, Osaka (JP); Ko Hamano, Kyoto (JP); Tadashi Maeoka, Osaka (JP); Yoshihiro Fujimoto, Osaka (JP); Takamichi Nakagawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/246,960

(22) Filed: Feb. 9, 1999

(30) Foreign Application Priority Data

Feb. 9, 1998 (JP) ............................................ 10-026958

(51) Int. Cl.⁷ ............................................... H04N 5/781
(52) U.S. Cl. ......................... 386/126; 386/111; 386/125
(58) Field of Search ........................ 386/1, 5–7, 45–46, 386/68–75, 81–82, 97, 124–126, 118, 96; 348/705, 744, 14.01, 373, 333.01, 333.1, 333.06, 375, 376; 369/77.1, 77.2, 75.1, 75.2, 270, 264, 263; 725/87

(56) References Cited

U.S. PATENT DOCUMENTS

| | | | | |
|---|---|---|---|---|
| 4,550,343 A | * | 10/1985 | Nakatani | 386/97 |
| 5,550,754 A | * | 8/1996 | McNelley et al. | 348/14.01 |
| 5,742,334 A | * | 4/1998 | Yagura et al. | 348/96 |
| 6,018,765 A | * | 1/2000 | Durana et al. | 725/87 |
| 6,115,068 A | * | 9/2000 | Ariga et al. | 348/373 |
| 6,268,891 B1 | * | 7/2001 | Yeo et al. | 348/744 |
| 6,374,040 B2 | * | 4/2002 | Mizoguchi et al. | 386/125 |
| 6,456,583 B1 | * | 9/2002 | Sohn et al. | 369/270 |

* cited by examiner

Primary Examiner—Thai Tran
Assistant Examiner—Christopher Onuaku
(74) Attorney, Agent, or Firm—RatnerPrestia

(57) ABSTRACT

An audio-video playback device in which a plane formed by the right sides of the device body and a plane formed by the right side of the monitor portion are on a substantially same plane, and the plane is substantially orthogonal to the rotation axis (R-R) of rotatably supporting portions. The center of gravity of the device body is located toward the right side, whereby the stable side-down setting of the device in the manner that the right sides (1R and 2R) face downward is realized. While, operation switches and the like are not disposed on the right sides, a user lying down can operate the device and watch natural display images and listen to natural sounds if the device is sidewards.

21 Claims, 18 Drawing Sheets

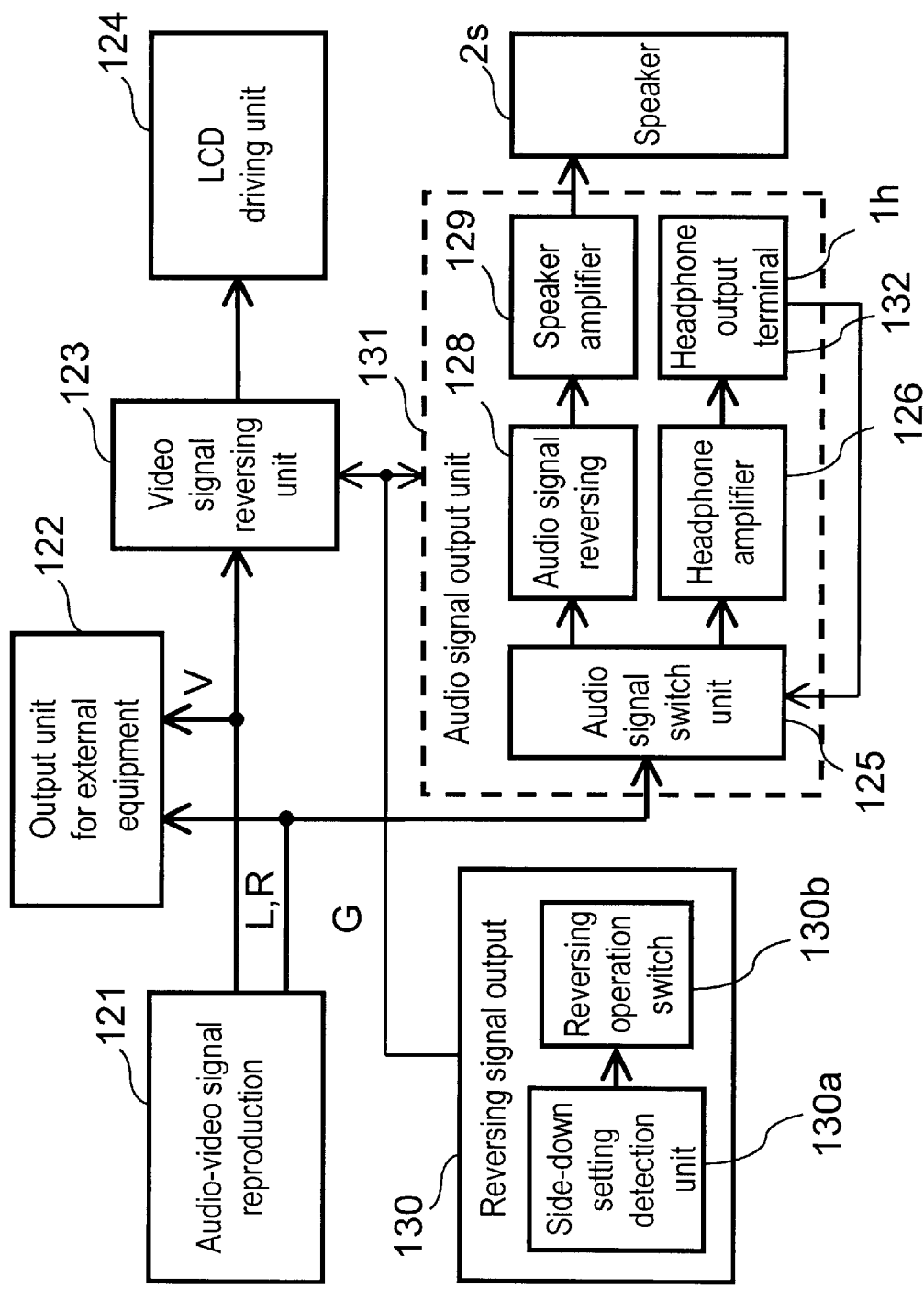

FIG. 14
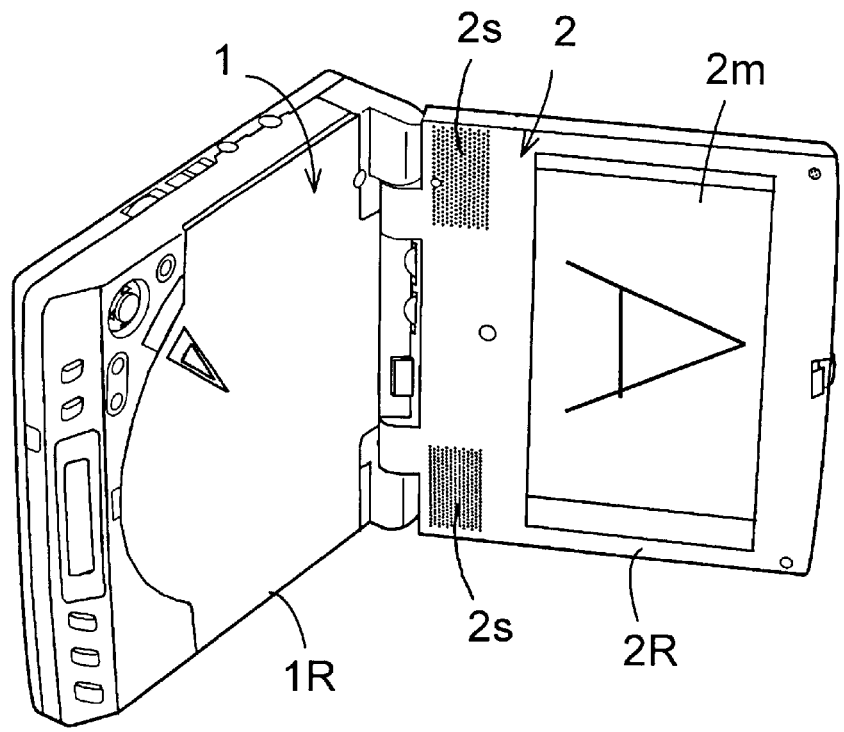
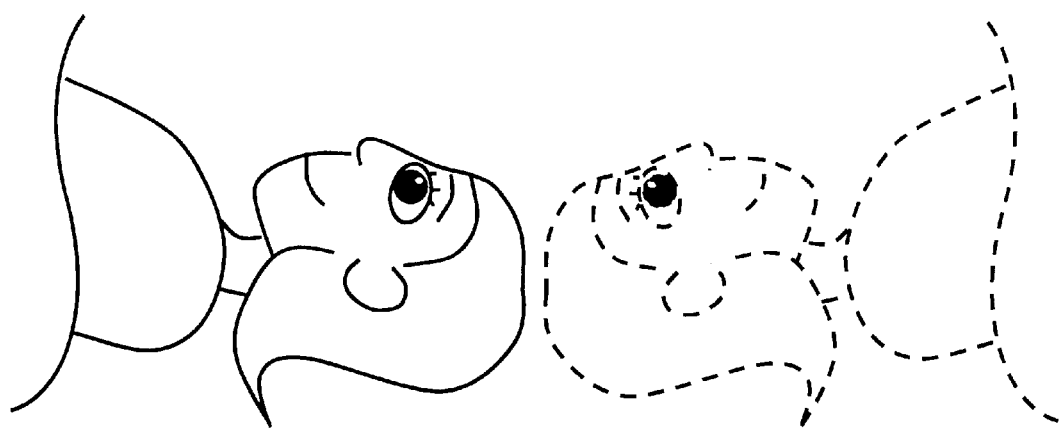

FIG. 17
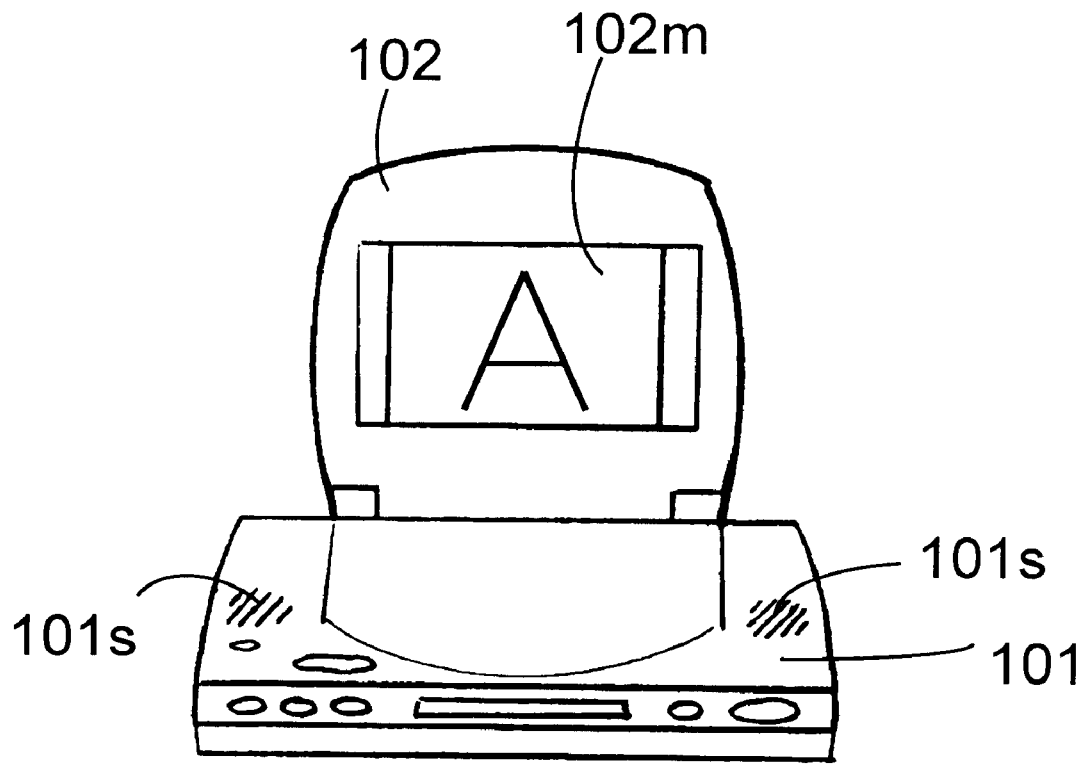
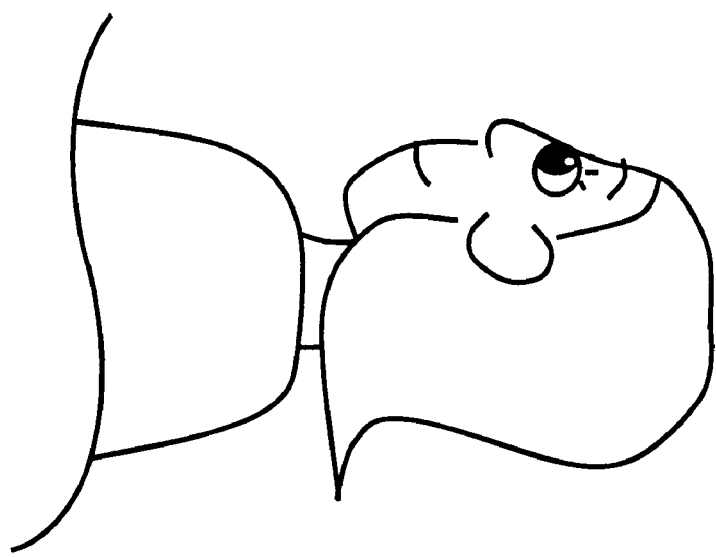

AUDIO-VIDEO DEVICE REPRODUCING APPARATUS

FIELD OF THE INVENTION

The present invention relates to audio-video playback device that at east reproduces images and sounds recorded in a recording and reproducing medium such as a disk type recording and reproducing medium (hereinafter referred to as disk), and a tape type recording and playback medium or the like. The images are reproduced by a liquid crystal display (LCD) monitor, speakers and a headphone.

BACKGROUND OF THE INVENTION

In recent years, various types of audio-video playback device that reproduce images and sounds recorded in a disk such as a video compact disk (Video-CD), digital versatile disk (DVD) or the like are proposed. In the recent trend of reducing weight and size of electronic device, much attention has been paid to compact type disks for personal use.

Hereinafter a conventional audio-video playback device is described referring to illustrations.

FIG. 16 shows an example of a conventional audio-video playback device. In FIG. 16, an device body 101 has a shape of sideways long rectangular parallelepiped, and has a disk cover 101*l* at the center part of the top side 101U. A disk (not illustrated) is set under the cover 101*l* by opening the cover 101*l*. Operation switches 101c are disposed on the front side 101F and the top side 101U of the device body 101 for the operation such as playback, stop and the like of the disk. Speakers 101s are disposed on the top side 101U at both left and right sides of the disk cover 101*l*, for outputting playback sounds of the disk in stereo, to which a plurality of persons can listen at the same time.

The left side 101L and the right side 101R of the device body 101 have a roundish curved surface. On the left side 101L, a headphone terminal 101*h* is disposed. Through a headphone (not illustrated) connected to the terminal 101*h*, the user of the device can enjoy playback sounds of the disk alone because the sound output from the speakers 101s are cut when the headphone is connected to the terminal 101*h*. On the right side 101R, a power source terminal 101p is disposed. To the terminal 101p, an AC adapter (not illustrated) for connection to home use electricity or a DC adapter (not illustrated) for connection to car battery is connected for supplying electric power to the audio-video playback device. On the back side 101B, an audio signal output terminal 101a and a video signal output terminal 101v are disposed for outputting the respective signals for an external stereo amplifier (not illustrated) and for an external TV monitor (not illustrated). At around the four corners of the bottom side 101S, rubber legs 101g are solidly attached by an adhesive (one of the legs is shown in FIG. 16). A monitor portion 102 has a rectangular parallelepiped shape of the size smaller than the projected plane area of the device body 101. The monitor portion 102 is rotatably supported by rotatably supporting portions 103 disposed at the back end, close to the back side 101B, of the top side 101U, and opens or closes over the top side 101U of the device body 101. At the center part of the display side 102I of the monitor portion 102, a liquid crystal display unit (hereinafter referred to as LCD) 102m is disposed for displaying playback images of the disk.

The conventional audio-video playback device having the above structure is set on a study desk, a dining table or a flat portion beyond driver's sight of a car dashboard (hereinafter referred to as desk for these) in the manner that the bottom side 101S faces downward, then the electric power is supplied through the power source terminal 101p of the right side 101R. By operating the operation switches 101c, many people can watch the playback images and listen to the playback sounds at the same time. When a user wants to enjoy playback sounds alone, it can be done by connecting a headphone to the headphone terminal 101*h* because the sounds do not come out from the speakers when the headphone is connected to the terminal. The connection cord of the headphone often extends from the left side of a headphone, accordingly the headphone can be neatly connected by the cord to the device having a headphone terminal at the left side 101L.

However, there are the following problems in the structure of conventional audio-video playback device. The left and the right sides of the device body have a curved shape and have terminals respectively, and, the size of the device body and that of the monitor portion are different from each other. Therefore, stable side-down setting of the device in the manner that the right or the left side of the device faces downward is difficult, i.e., the device can only be set stably in the manner that the bottom side of the device body faces downward. Therefore, a user laying himself or herself in the manner that his or her head is laid as illustrated in FIG. 17 cannot watch playback images in a directionally natural state. Also, since the speakers are disposed on the device body in stead of the monitor portion, a user cannot face to the speakers even in ordinary setting of the device. Therefore sufficient sound characteristics cannot be obtained, and thus, when the user lies down, he hears the sounds from the upper and the lower side of the device, accordingly the stereo effect cannot be obtained.

SUMMARY OF THE INVENTION

An audio-video playback device of the present invention comprises an device body having a left and a right sides reproduces an audio and a video signals recorded in a recording and playback medium, and outputs the reproduced signals, a monitor portion having a left and a right sides, display means disposed on the main surface of the monitor portion, for displaying an image according to a video signal inputted from the device body, and rotatably supporting portions disposed on the device body and having rotation axis for rotatably supporting the monitor portion, wherein, a plane formed by a first side out of the left and the right sides of the device body and a plane formed by a second side, located at the same side with the first side, out of the left and the right sides of the monitor portion, form a substantially same plane, and the substantially same plane is substantially vertical to the rotation axis of the rotatably supporting portions, and the gravity center of the device body locates between a center line and the first side, wherein the center line locates in the center between the left side and the right side of the device body.

In the above structure, the first side of the device body and the second side, which locates at the same side with the first side, of the monitor portion are substantially on the same plane that is substantially vertical to the rotation axis, and, the gravity center of the device body locates toward the first side of the device body. Accordingly, the very stable setting of the device in the manner that the first side of the device body faces downward in the state that the monitor portion is opened by rotating the monitor portion on the rotation axis (hereinafter referred to as side-down setting) is realized. The side-down setting is as stable as the setting of device in the manner that the bottom side of the device faces downward (hereinafter referred to as ordinary setting). Accordingly, an audio-video playback device, in which a user can watch images displayed on the display area in the state that the device is set in the manner that either of the bottom side or the first side faces downward, can be obtained.

The audio-video playback device of the present invention has no operation switches and no input/output terminals on the first side of the device body and the second side of the monitor portion, and has a structure that the gravity center of the device body locates toward the first side of the device body.

In this structure, terminals such as power source terminal, headphone terminal and the like and switches such as power source switch, playback operation switches and the like are not disposed on the first side of the device body and the second side of the monitor portion, and the gravity center of the device body locates toward the first side. Accordingly an audio-video playback device, in which very stable side-down setting as in the ordinary setting and audio-video playback operation are practicable and a user can operate for watching images displayed on the display area in the state that either of the bottom side or the first side faces downward, can be obtained.

The audio-video playback device of the present invention has a reversing signal output unit that outputs reversing instruction signal for reversing display images upside down and left to right and for reversing sounds left to right, a video signal reversing unit that reverses video signals and outputs video signals of images of upside down and left-right reversed according to the reversing instruction signal after receiving video signals from an audio-video signal reproduction unit, a display unit for displaying images according to the video signals received form the video signal reversing unit, an audio signal output unit that outputs audio signals to a headphone when the headphone is connected or to speakers when the headphone is disconnected after receiving audio signals from audio-video signal reproduction unit and the reversing instruction signal. In this case, when the reversing instruction signal is outputted by operating the reversing operation switch of the reversing signal output unit, the display images are reversed upside-down and left to right, and the sounds are reversed left to right. However it is formed in the manner that the audio signal output unit outputs audio signals of left-right reversed according to the reversing instruction signal only when the sounds of the audio signals are outputted from speakers.

By the above structure, an audio-video playback device, in which a user can reverse the images and sounds by his or her operation for watching and listening through either speakers or headphone natural display images and natural sounds in the state of laying himself or herself in the manner of his or her right side down or left side down, can be obtained.

BRIEF DESCRIPTION OF THE DRAWINGS

FIG. 13B is a block diagram showing another structure of an audio-video playback device of a fifth exemplary embodiment of the present invention, FIG. 14 shows an example how the audio-video playback device is used in the fifth exemplary embodiment of the present invention, FIG. 17 shows an example how the conventional audio-video playback device is used.

DESCRIPTION OF THE PREFERRED EMBODIMENTS

First Exemplary Embodiment

Hereinafter a first exemplary embodiment of the present invention is described referring to FIG. 1 through FIG. 6.

Figure 1:
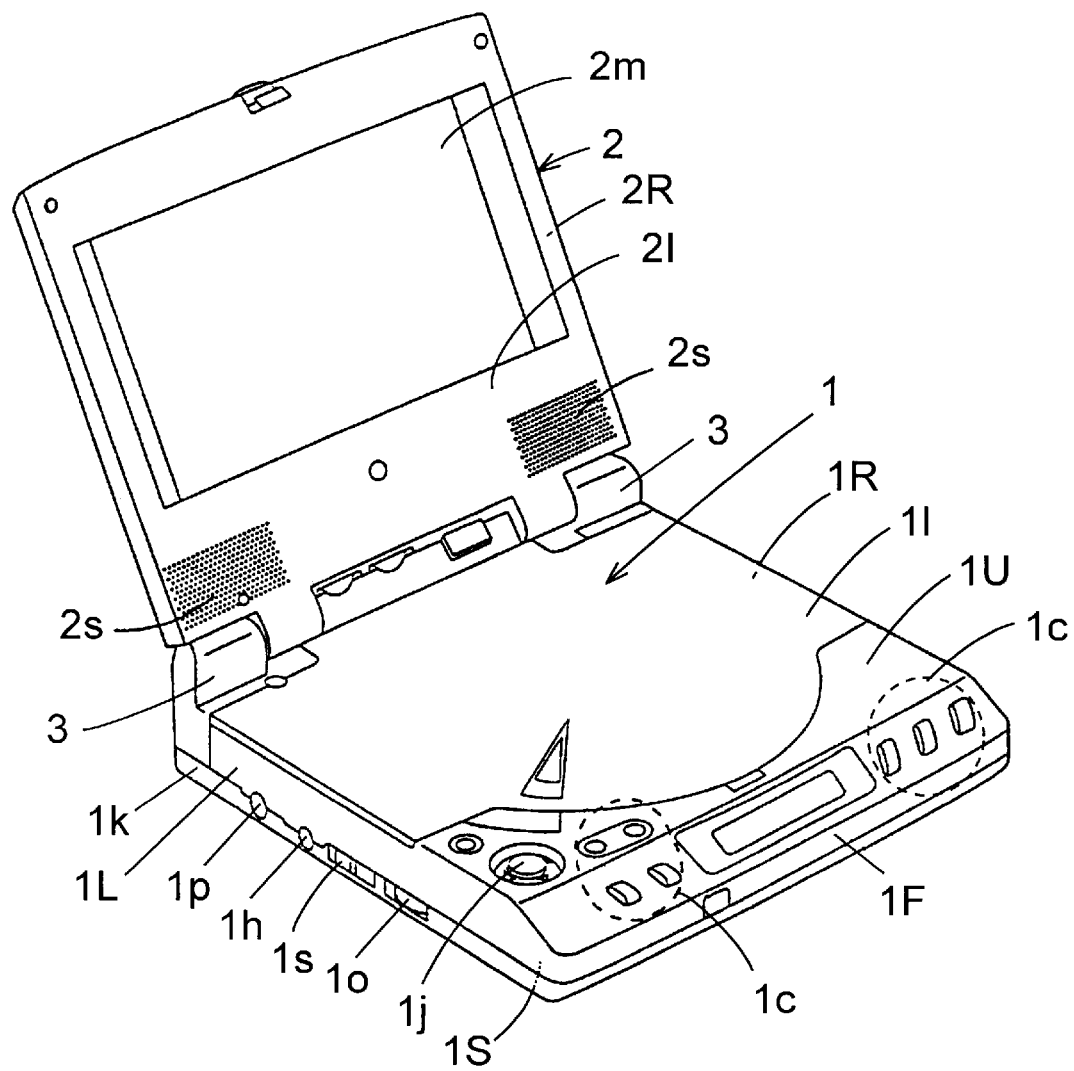
FIG. 1 is a perspective view showing the structure of an audio-video playback device in a first exemplary embodiment of the present invention, seen from the left-front of the device.
Figure 2:
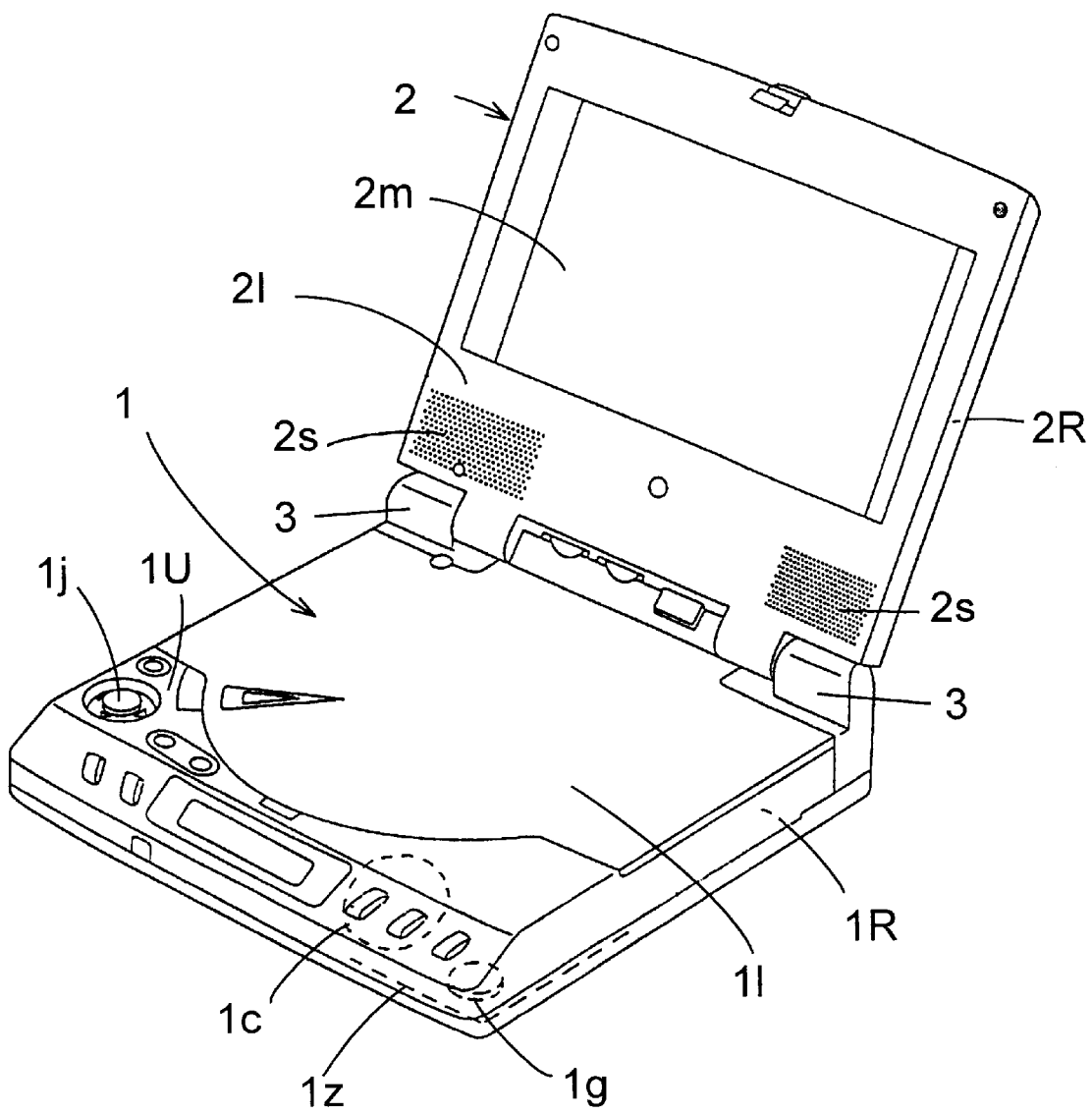
FIG. 2 is a perspective view showing the structure of the audio-video playback device in the first exemplary embodiment of the present invention, seen from the right-front of the device.
Figure 4:
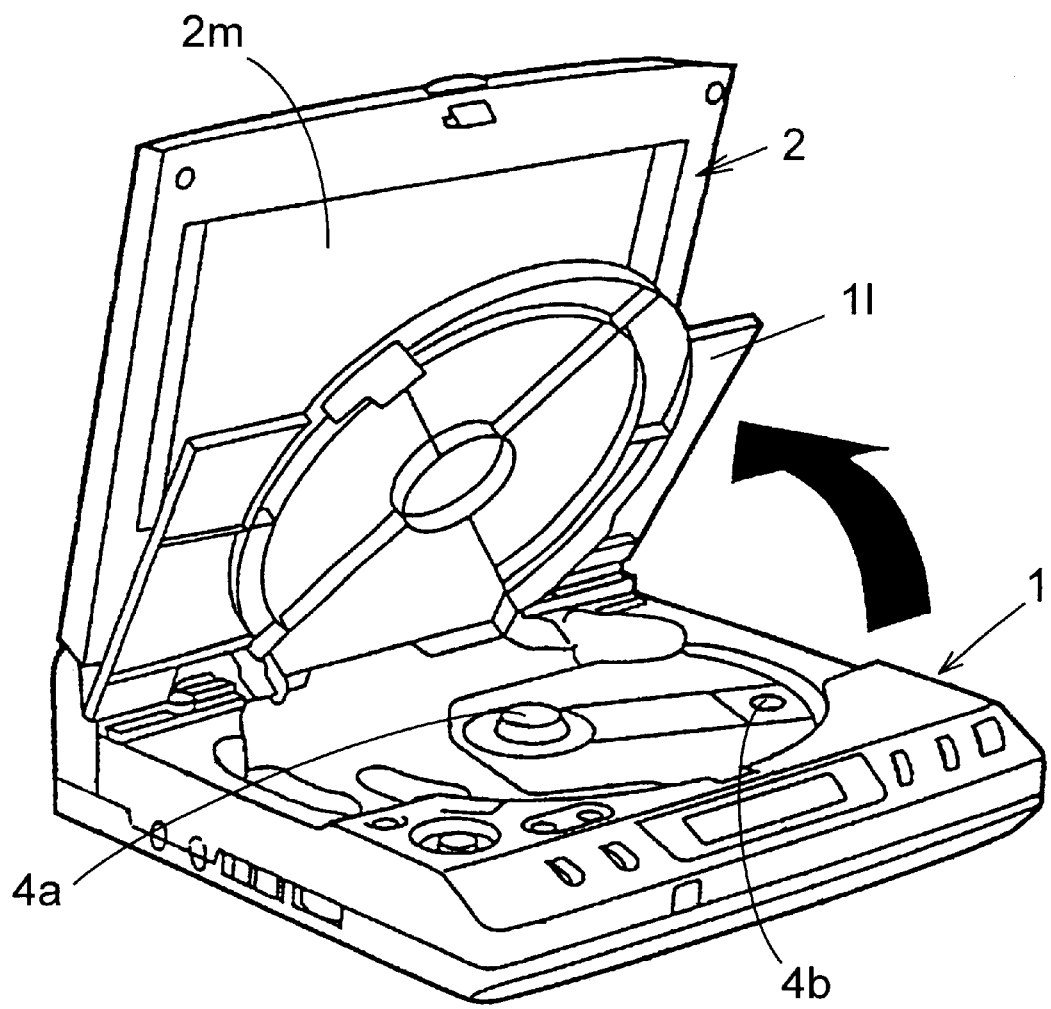
FIG. 4 is a perspective view showing the structure of the audio-video playback device in the first exemplary embodiment of the present invention, in the state that the disk cover is open, seen from the left-front of the device.

In FIG. 1 and FIG. 2, the device body 1 has a rectangular parallelepiped shape having almost same dimensions of depth and width. On the top side 1U, a disk cover 1*l* is disposed. By opening the disk cover 1*l*, a storage medium such as a disk (not illustrated) can be set to a spindle portion 4*a* (ref. FIG. 4 ). Operation switches 1*c* and a selection joystick switch (hereinafter referred to as J switch and the details is described later) 1*j* are disposed on the front side 1F and the top side 1U of the device body 1 for the operation such as the playback, stop or the like of the disk.

The surfaces of the left side 1L and the right side 1R are substantially planar. On the left side 1L, a headphone terminal 1*h*, a power source terminal 1*p*, a power source switch is and a sound volume control knob 1*o* are disposed. By connecting the power source terminal 1*p* to an AC adapter connected to home use electricity or a DC adapter (not illustrated) connected to a car battery, electric power is supplied to the audio-video playback device. By connecting a headphone (not illustrated) to the headphone terminal 1*h* as in the conventional audio-video playback device, sounds come out from a headphone, and the sound output from speakers 2*s* (described later) is cut, accordingly the user alone can enjoy the sounds. On the right side 1R, no operation switch and no terminal is disposed, and no protrusion is formed. A case 1*k* comprising the upper side 1U, the left side 1L and the right side 1R are made of plastic by molding, in general. The back side 1B and the bottom side 1S are formed by respectively attaching by screws a piece of sheet metal 1*m* bent substantially orthogonally, to the molded plastic case part as in FIG. 3. On the back side 1B, an audio signal output terminal 1*a* and a video signal output terminal 1*v* are disposed for respectively connecting to an external stereo amplifier and an external TV monitor (both are not illustrated). On almost all over the surface of bottom side 1S, plastic sheet 1*z* (shown partially by dotted line in FIG. 2) is stuck. At around the four corners of the bottom side 1S on which the plastic sheet 1*z* is stuck, rubber legs 1*g* (one of them is shown in FIG. 2) are solidly stuck by an adhesive.

A monitor portion 2 has a rectangular parallelepiped shape having substantially the same width as that of the device body 1. The monitor portion 2 is rotatably supported by rotatably supporting portions 3 disposed at the back end, close to the back side 1B, of the top side 1U, and the monitor portion 2 can be opened or closed over the top side 1U of the device body 1. At the center part of the display side 2I of the monitor portion 2, an LCD 2*m* is disposed for displaying the playback images of a disk. Speakers 2*s* are disposed on the monitor portion 2, at left and right, between the LCD 2*m* and the rotatably supporting portions 3. The playback sounds of a disk come out from the speakers in stereo and even many persons can listen to the sounds at the same time.

The J switch 1*j* is disposed at around the left-front of the top side 1U of the device body 1. The J switch 1*j* is for selecting operation menu from the menus displayed on the LCD 2*m* of the monitor portion 2 by twirling the knob of the J switch 1*j* by a forefinger, e.g. The selected menu is fixed by pushing the knob of the J switch 1*j*. The J switch is often used even during the running of playback. The J switch 1*j* may be larger in height than an ordinary pushing switch because it has multiple contact points for switching by moving in the directions of left-right, front-back and up-down.

Figure 5:
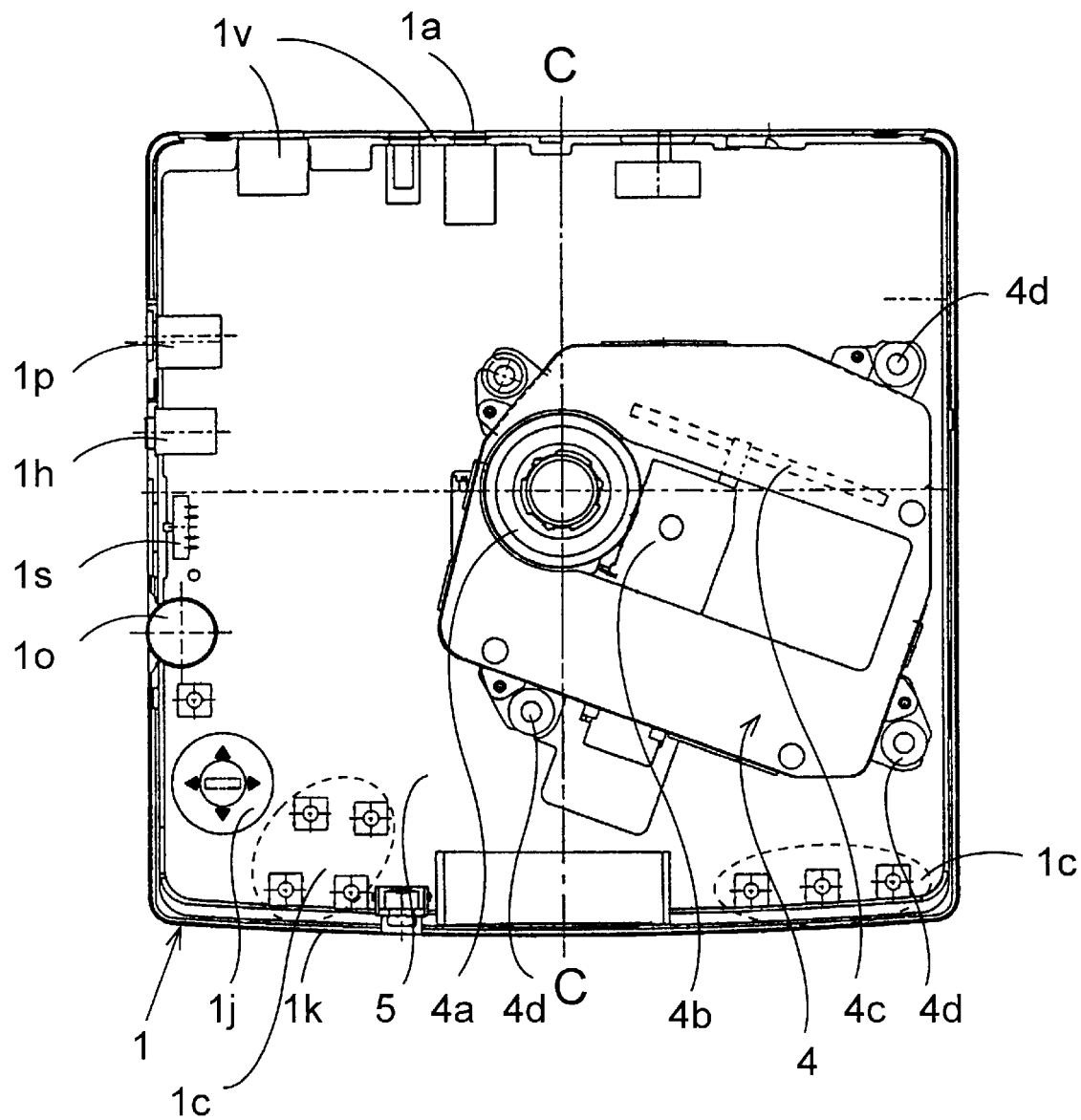
FIG. 5 is a plain view showing the internal outline structure of the audio-video playback device in the first exemplary embodiment of the present invention.

FIG. 5 shows the outline internal structure of the device body 1. In FIG. 5, the mechanism 4 is formed with a spindle portion 4*a* that rotates a disk (not illustrated) in high speed, a pickup portion 4*b* that detects the data of the disk by irradiating a light beam on the disk while it is rotating, and a traverse portion 4*c* that moves the pickup portion 4*b* along the diameter direction of the disk. The portions forming the mechanism 4 are mainly made of various metals such as stainless steel, aluminum, brass and the like. The mechanism 4 having the above structure is attached to a case 1*k* via three dampers 4*d* toward the right side from around the center of the device body 1. The three dampers 4*d* are for absorbing the vibration caused by the mechanism 4 so that the vibration does not spread to the device body 1, also for absorbing external shock on the device body 1 in car use, or, in carrying by hand or on shoulder by a carrying belt (not illustrated) so that the vibration does not spread to the mechanism 4.

A printed wiring board (hereinafter referred to as PWB) 5 comprises a circuit for controlling the drive of the mechanism 4, a circuit for demodulating data detected from a disk into images and sounds, a circuit for controlling these circuits according to the operation of the user, and a circuit for stable supply of electric power to these circuits (all these circuits not illustrated). The PWB 5 is disposed under the mechanism 4, on the inner side of the bottom of the device body 1. As described above, since the device body 1 formed in the manner that the heavy mechanism 4 mostly locates toward the right side from around the center line C-C (ref. FIG. 5), the center of gravity of the device body 1 locates toward the right side, between the center line C-C and the right side 1R. While, since the high J switch 1*j* can be disposed at the position apart from the mechanism 4, the device body 1 does not become thick due to the height of the J switch 1*j*.

The operation of the audio-video playback device having the above structure is described hereinafter. The audio-video playback device of this embodiment can be used for watching the playback images and for listening to the playback sounds of a disk, even by many persons at the same time, by setting the device body on the above described desk in the manner that the bottom side 1S faces downward as shown in FIG. 1 as in the case of the conventional device, supplying electric power through the power source terminal 1*p* of the left side 1L from the above described power source, and operating the switches 1*c*.

In this case, the difference from the conventional device is that the speakers 2*s* are disposed at the low part of the surface on which the LCD 2*m* is disposed. Therefore, the user can enjoy the sounds without losing the sound characteristics because the speakers 2*s* face toward the users almost directly when the rotation angle of the LCD 2*m* is adjusted to face the users. When a user wants to enjoy the playback images and sounds alone without disturbing any other person, it can be done by connecting a headphone to the headphone terminal 1*h* because the sound output from the speakers 2*s* is cut when the headphone is connected. Also, in most cases except a few exceptions, the connection cord of the stereo headphone extends from the left ear side (or both sides) of the headphone or from both ear sides of the headphone, accordingly the headphone can be neatly connected by the cord to the headphone terminal 1*h* disposed on the left side 1L of the device body 1. Therefore the crossing of the connection cord between the user and the audio-video playback device does not occur, accordingly the connection cord is hardly damaged.

Figure 6:
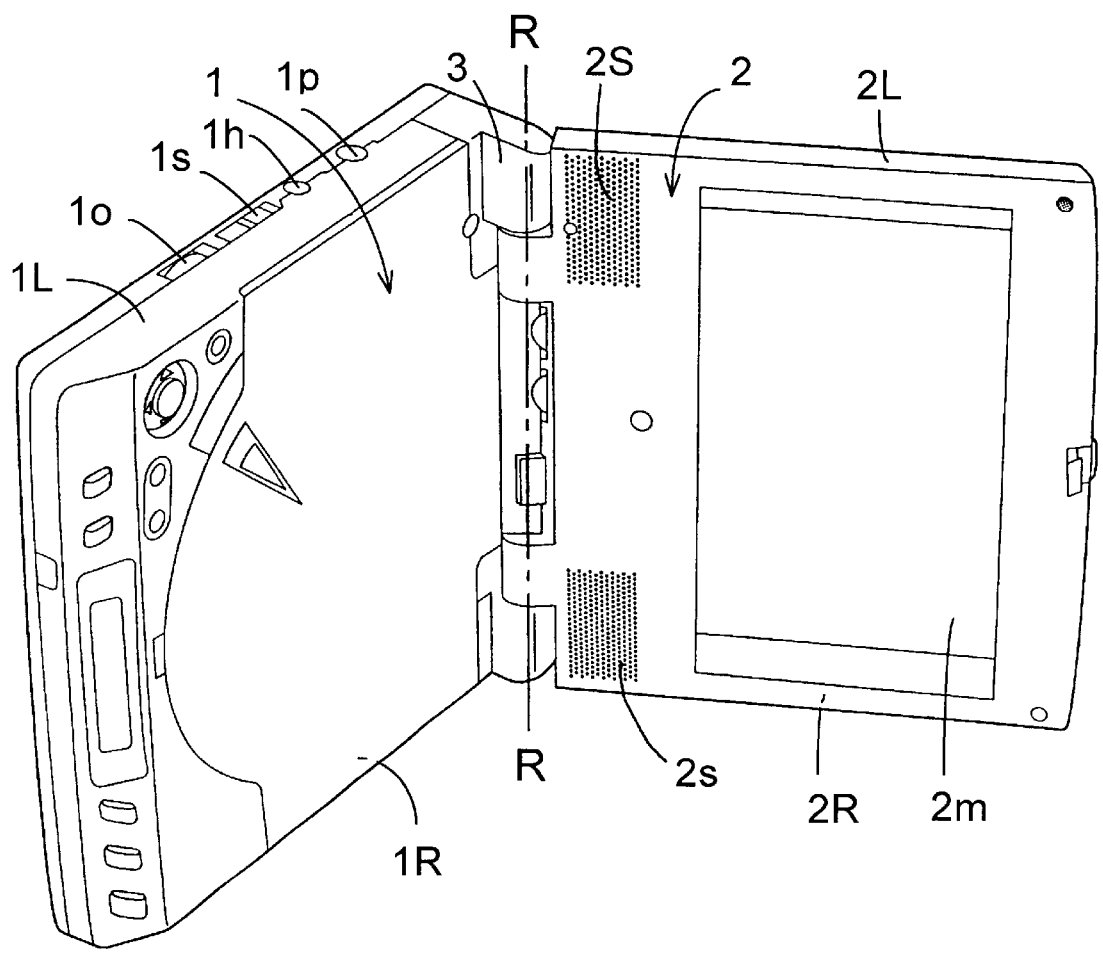
FIG. 6 is a perspective view showing the outline structure of the side-down setting of the audio-video playback device in the first exemplary embodiment of the present invention.

Also, since the speakers 2*s* that vibrate monitor portion 2 are disposed at position close to the rotatably supporting portions 3, the torque caused by the vibration of the speakers 2 to rotate the monitor portion 2 on the rotation axis R-R of the rotatably supporting portion (ref. FIG. 6) can be suppressed. Accordingly the stress on the rotatably supporting portions 3 can be reduced.

Also, there is no operation switch and no protrusion on the right side 1R of the device body 1, and the right sides 1R of the device body 1 and the right sides 2R of the monitor portion 2 are respectively on a substantially same plane that is substantially orthogonal to the rotation axis R-R of the rotatably supporting portions 3, also both right sides 1R and 2R are on a substantially same plane in any rotating angle of the monitor portion 2. Accordingly the device can be set in the manner that the right sides 1R and 2R face downward in the state that the monitor portion 2 is open as shown in FIG. 6. Additionally, since the mechanism 4 is located toward the down side in this state, the center of gravity of the device body 1 is also located under the center line C-C, and toward the right side 1R. Accordingly, a very stable side-down setting of the device can be realized.

Also, since the power source switch 1s, the sound volume control knob 1o and the other operation switches 1c are located at the upper side and the front side of the device in the state of side-down setting, there is no inconvenience for the operation of the device. Especially since the J switch 1j is also at the upper-front side of the device body in this state, the J switch 1j can be operated by the thumb even during the running of playback by grasping the device body 1 by the thumb and the forefinger of a user, e.g. In the side-down setting also, the operation and the effect of speakers and a headphone terminal are the same as in the ordinary setting, whose details are described in the previous paragraph.

In this exemplary embodiment, as described above, no operation switch and no connection terminal is disposed on the right side of the device body, and the first side, i.e., the right side of the device body and the second side, i.e., the right side of the monitor portion supported rotatably to rotate around rotatably supporting portions disposed at around the back end of the device body are formed to be on a substantially same plane. Accordingly the effect of setting in the manner that the right sides of the device face downward can be obtained. Additionally the heavy mechanism is disposed toward the right side, whereby the effect of very stable side-down setting is obtained.

In the above, the first side, i.e., the right side of the device body and the second side, i.e., the right side of the monitor portion are described to be flat all over the sides. However, the same effect can be obtained when some portions of the respective sides are flat.

Also, the same effect can be obtained when crimps, grains or grooves are formed all over the respective right sides.

The meaning of "substantially on a same plane" in the above as in "a first side, i.e., right side of the device body and a second side i.e., right side of the monitor portion are substantially on a same plane" or "substantially vertical to the rotation axis" as in "the plane is substantially vertical to the rotation axis R-R of the rotatably supporting portions" mean that it is plane enough or vertical enough for the stable side-down setting of the device to the extent in which there is no inconvenience in practical use.

Second Exemplary Embodiment

Figure 7:
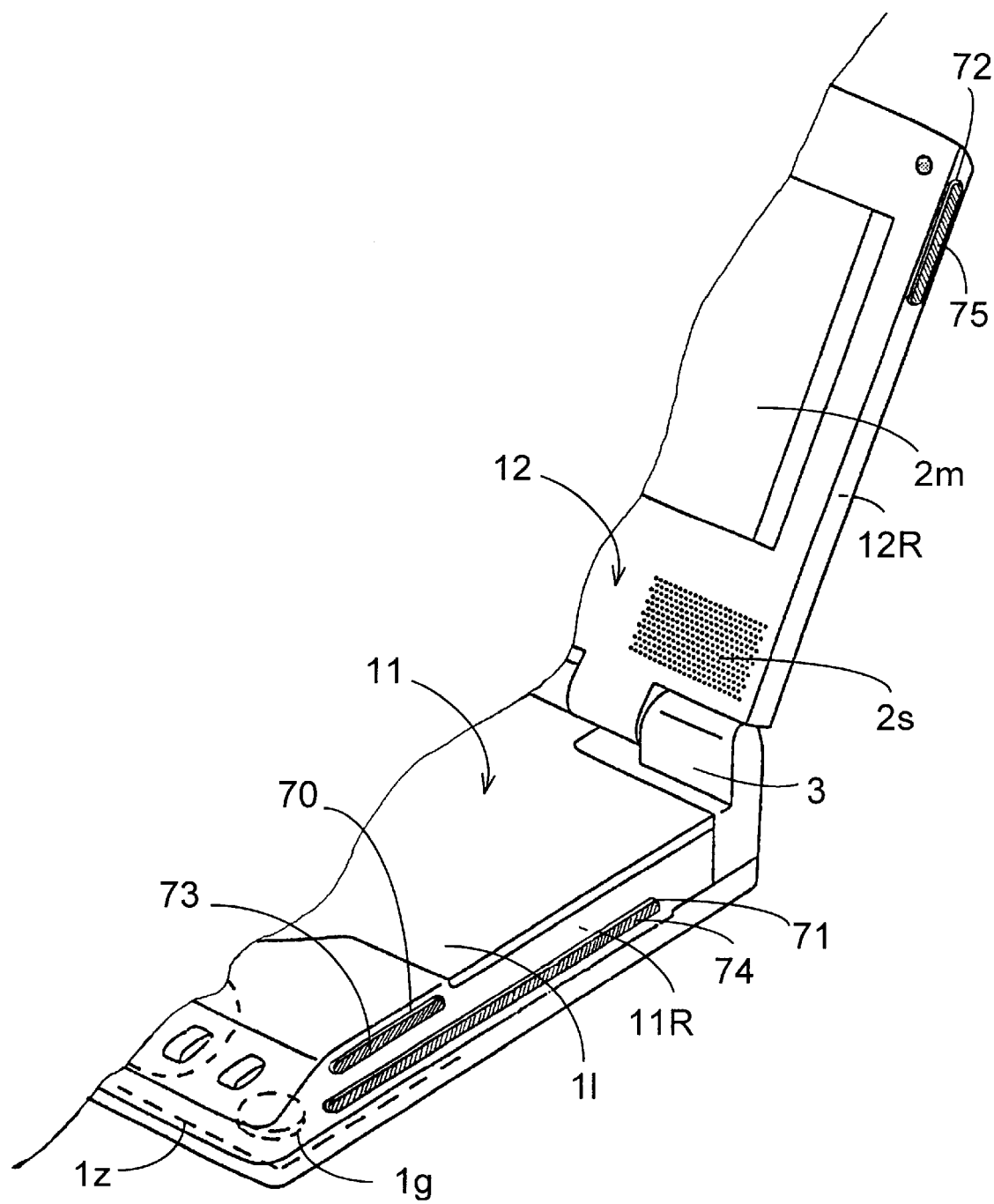
FIG. 7 shows an outline structure of an example of an audio-video playback device having rib shape protrusions on the right side, in a second exemplary embodiment of the present invention.
Figure 8:
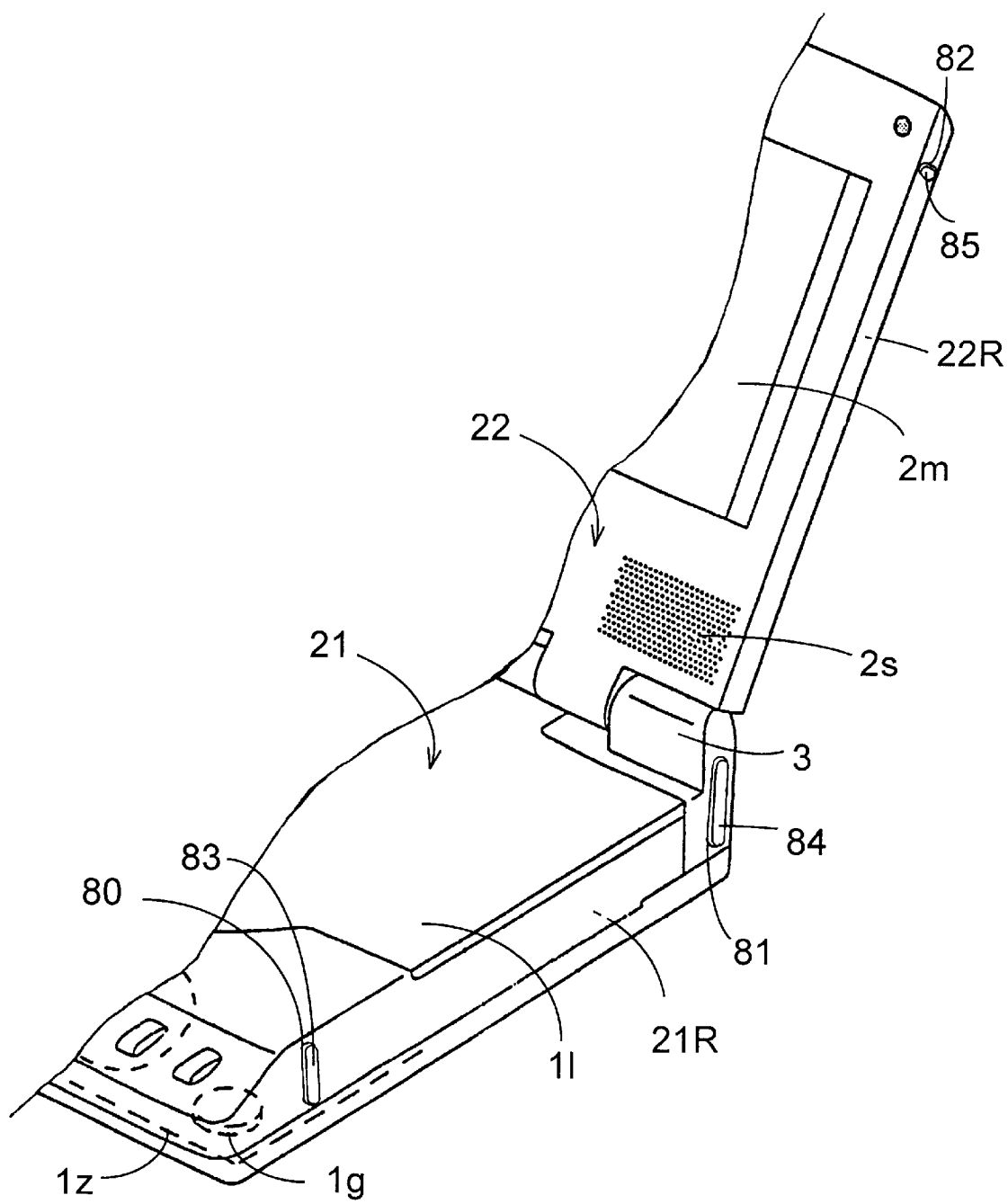
FIG. 8 shows an outline structure of a other example of an audio-video playback device having rib shape protrusions on the right side, in the second exemplary embodiment of the present invention.
Figure 9:
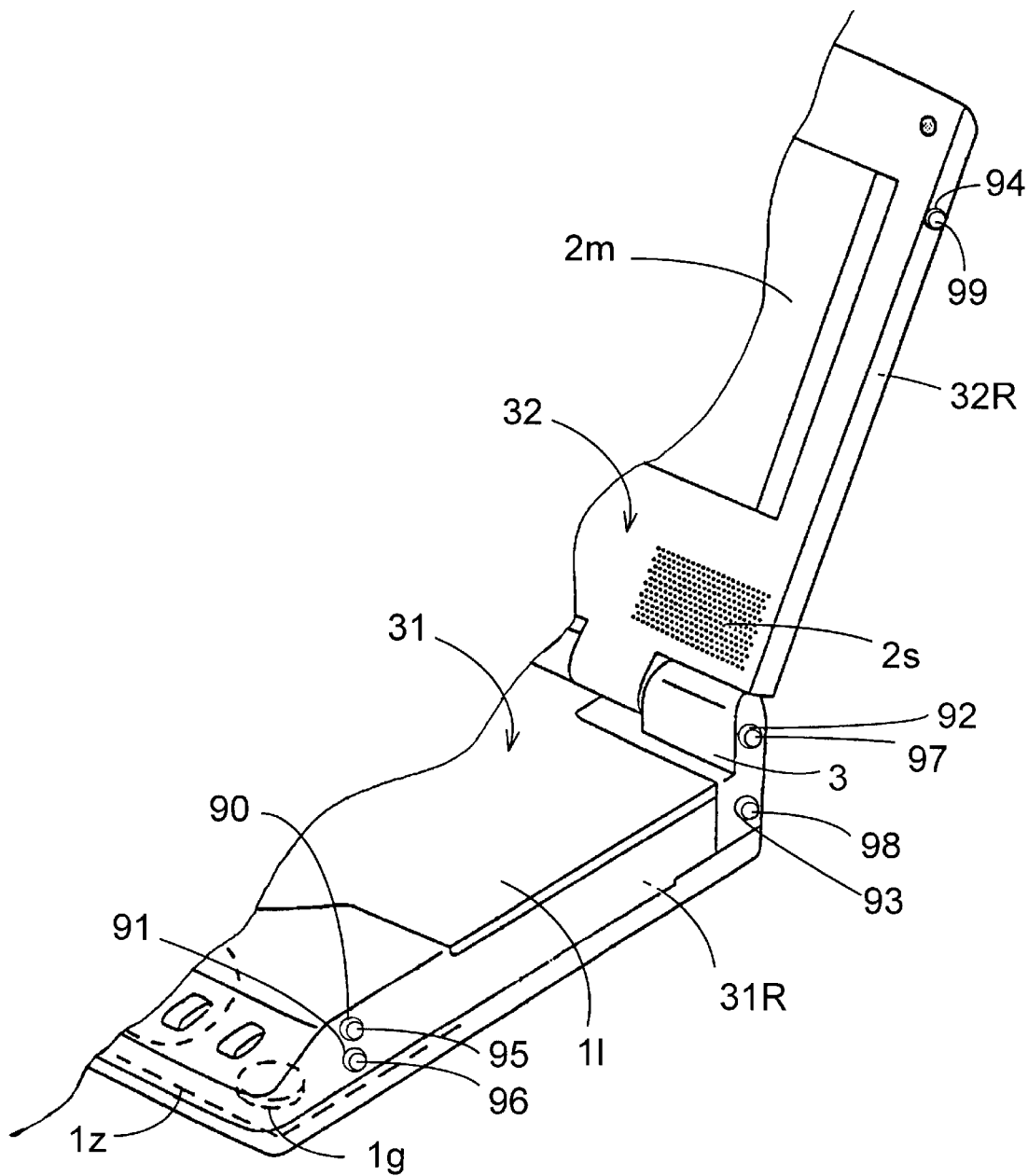
FIG. 9 shows an outline structure of an example of an audio-video playback device having cup shape protrusions on the right side, in the second exemplary embodiment of the present invention.

Hereinafter an audio-video playback device of a second exemplary embodiment of the present invention is described referring to FIG. 7 through FIG. 10. In FIG. 7 through FIG. 9, a device body 11, 21, 31, 41 a monitor portion 12, 22, 32, 42 and rotatably supporting portions 3 are the same as in the first exemplary embodiment except the shape of the right side.

In FIG. 7, two rib shape protrusions 70 and 71 are formed on the right side 11R of the device body 11, and one rib shape protrusion 72 is formed on the right side 12R of the monitor portion 12. The outermost portions (shaded portions in FIG. 7) 73, 74 and 75 of the protrusions 70, 71 and 72 are on a substantially same plane, and the plane is substantially vertical to the rotation axis R-R of the rotatably supporting portions 3. The other composing elements are the same as those in the first exemplary embodiment. In the above structure, since the plane formed by outermost portions 73, 74 and 75 of the right side 11R of the device body 11 and the right side 12R of the monitor portion 12 is on a substantially same plane, and the plane is substantially vertical to the rotation axis R-R of the rotatably supporting portions, and the gravity center of the device body 11 locates toward the right sides 11R and 12R as in the first exemplary embodiment, the stable side-down setting of the device can be realized.

FIG. 8 shows a second example of the audio-video playback device in this exemplary embodiment. In FIG. 8, protrusions 80 and 81 that are long along the top to bottom direction of device body 21 are formed on the right side 21R of the device body 1, and a protrusion 82 is formed on the right side 22R of the monitor portion 22. The plane formed by the outermost portions 83, 84 and 85 of the protrusions 80, 81 and 82 is on a substantially same plane, and the plane is substantially vertical to the rotation axis R-R. The above structure enables the stable side-down setting of the device.

FIG. 9 shows a third example of audio-video playback device in this exemplary embodiment. Although the right sides of the device body 31 and monitor portion 32 have rib shape protrusions in FIGS. 7 and 8, in FIG. 9, cup shape protrusions 90, 91, 92 and 93 are formed on the right side 31R of the device body 31, and a cup shape protrusion 94 is formed on the right side 32R of the monitor portion 32. And the outermost portions 95, 99, 97 and 98 of the cup shape protrusions 90, 91, 92 and 93 of the device body 31 are formed to be on a substantially same plane, and the outermost portion 99 of the cup shape protrusion 94 on the right side 32R of the monitor portion 32 is formed to be substantially on the above plane. This structure also enables the stable side-down setting of the device.

Figure 10A:
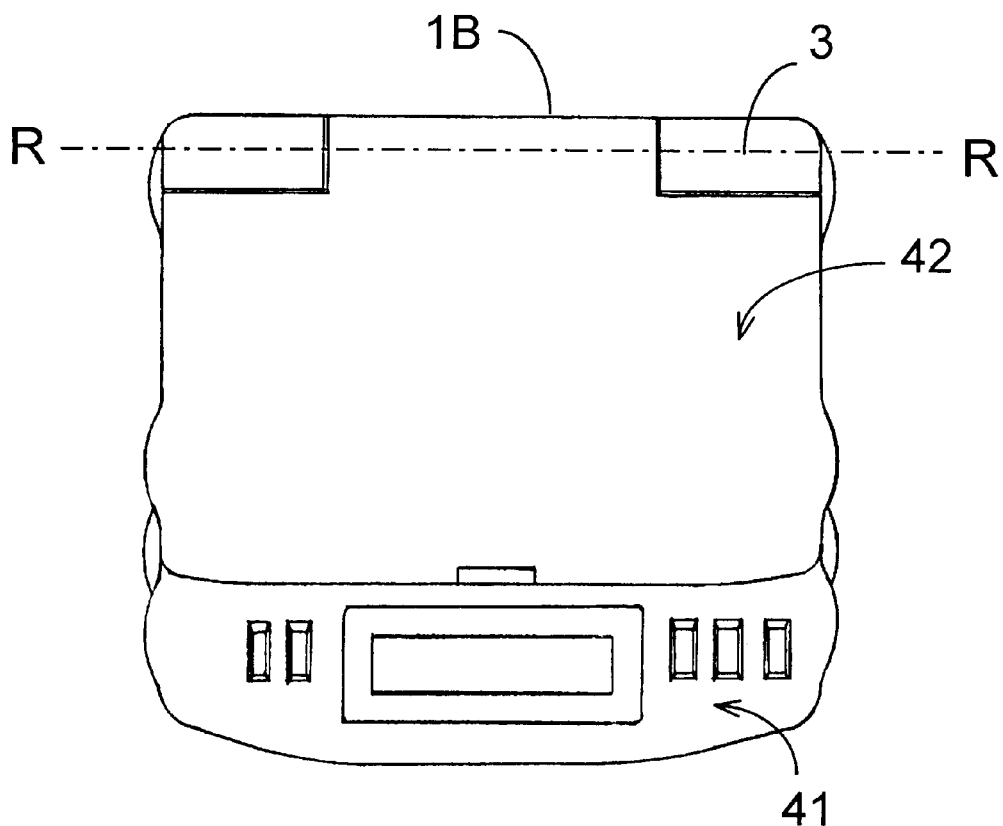
FIG. 10A shows a plan view of an example of an audio-video playback device having curved right sides, in the second exemplary embodiment of the present invention.
Figure 10B:
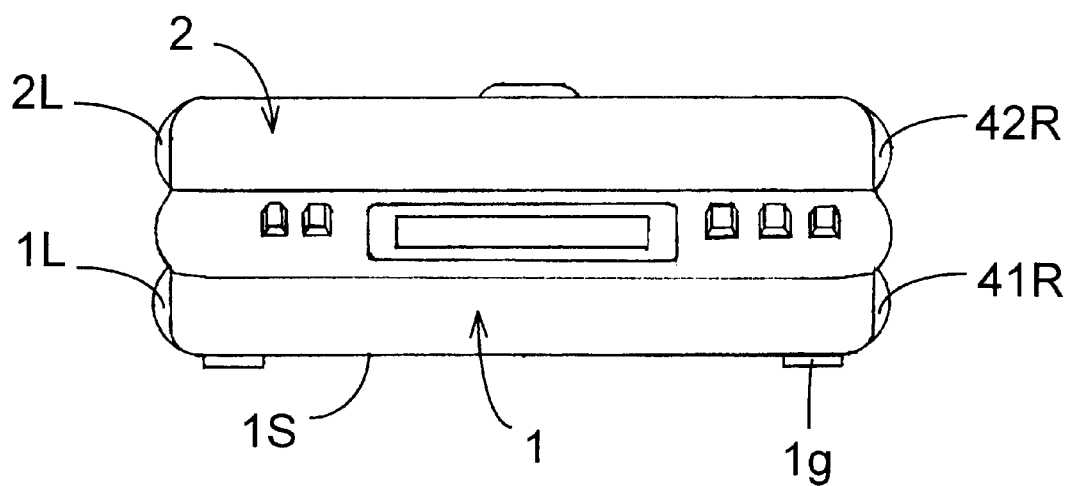
FIG. 10B shows the front view of the same.

FIGS. 10A and 10B shows a fourth example of audio-video playback device in this exemplary embodiment. The same effect can be obtained when the right side 41R of the device body 41 and the right side 42R of the monitor portion 42 have complicated curved shape as shown in FIGS. 10A and 10B. For example, when a plane formed by three outermost points on the right side 41R of the device body 41 is substantially flat and a plane formed by the outermost portion on the right side 42R of the monitor portion 42 is also substantially flat, and both planes are substantially on the same plane, and substantially vertical to the rotation axis R-R, also the gravity center of the device body 41 locates toward the right side 41R of the device body 41 as in the case of the first exemplary embodiment, the stable side-down setting of the device can be realized.

Also, the same effect can be obtained in the combination of the above examples of FIG. 7, FIG. 8, FIG. 9, and FIG. 10 and the first exemplary embodiment.

Third Exemplary Embodiment

Figure 11:
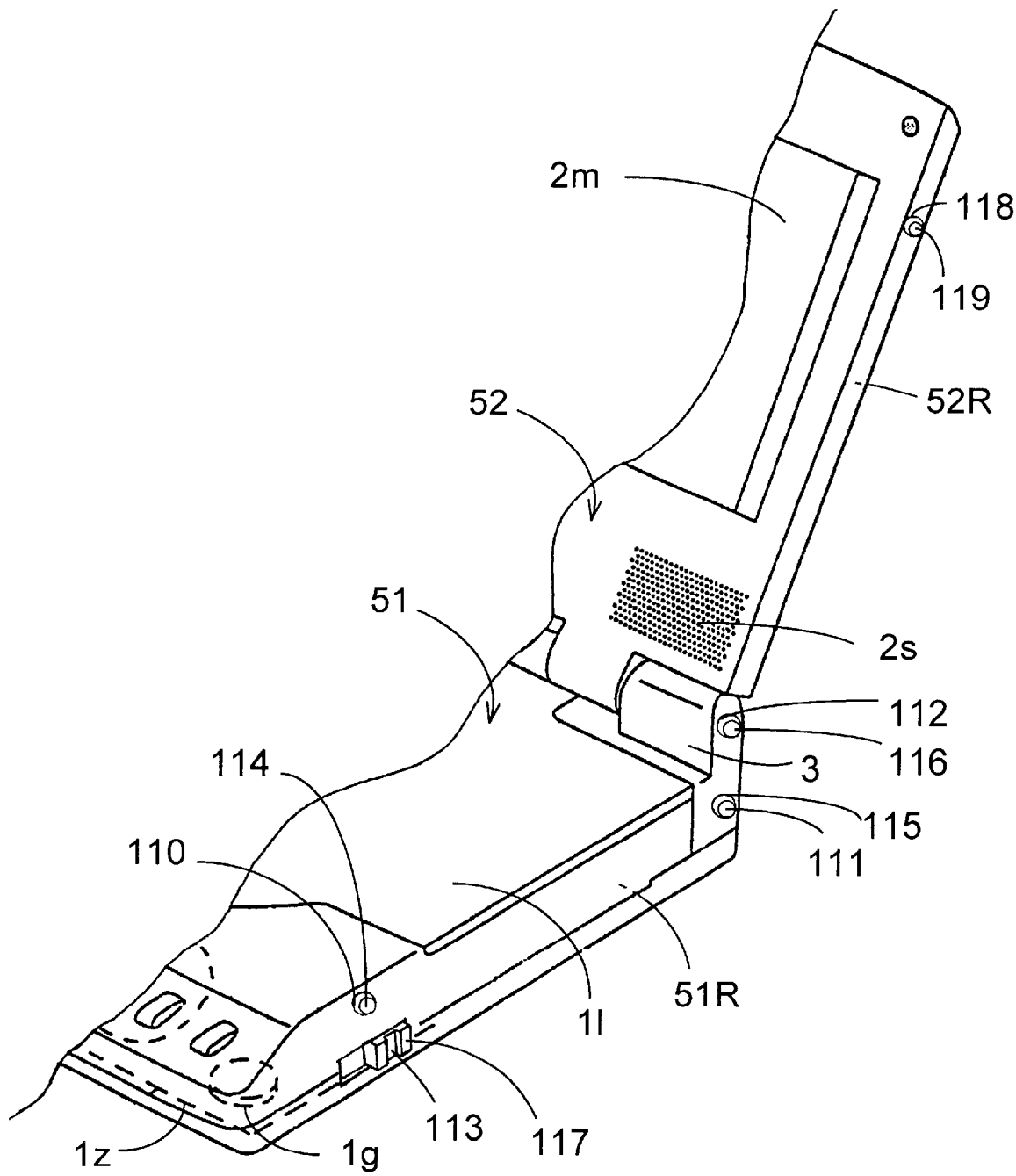
FIG. 11 shows an outline structure of the right sides of an audio-video playback device in a third exemplary embodiment of the present invention.

Hereinafter a third exemplary embodiment of the present invention is described referring to FIG. 11. Cup shape protrusions 110, 111 and 112, and also switching unit 113 are formed on the right side 51R of the device body 51. The switching unit 113 is for example the one that is not used often, e.g., the one having a function of switching to audio playback only for compact disk (CD) in which video playback is unnecessary. A protrusion 118 is a cup shape protrusion formed on the right side 52R of the monitor portion 52. The outermost portions 114, 115, 116 and 117 of the protrusions 110, 111, 112 and the switching unit 113 are on a substantially same plane, and the outermost portion 119 of the protrusion 118 is also substantially on the same plane, and the same plane is substantially vertical to the rotation axis R-R, also, the gravity center of the device body 51 is located toward the side on which the switching unit 113 is disposed. This structure enables the stable side-down setting of the device same as in the first exemplary embodiment.

Fourth Exemplary Embodiment

Figure 12A:
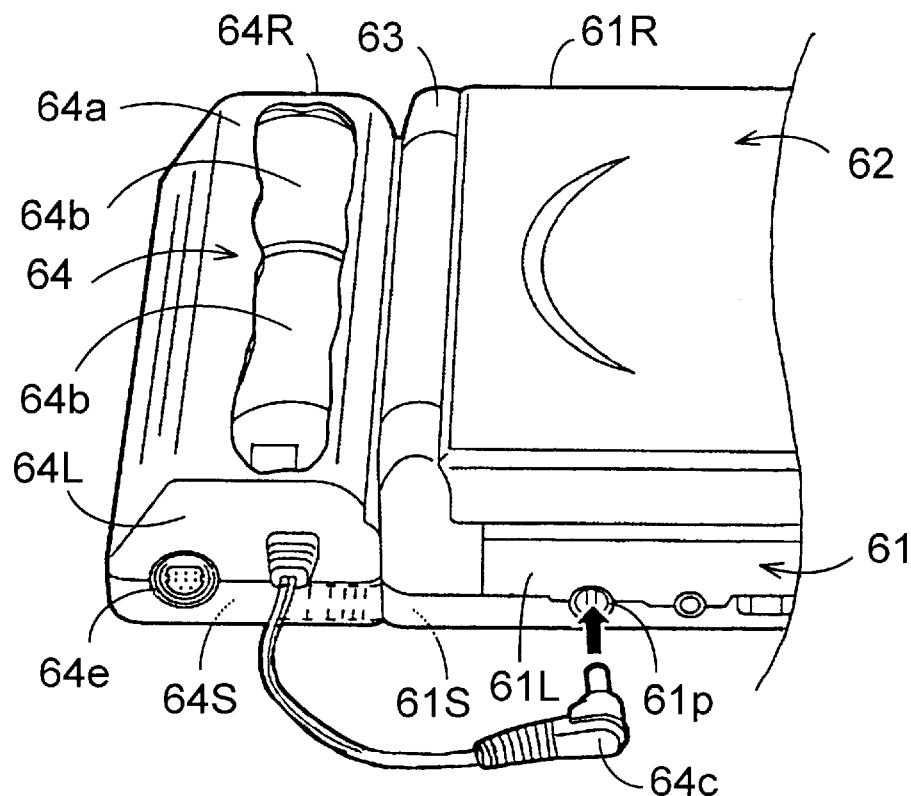
FIG. 12A is a perspective view showing structure in which a sub-device is solidly attached to the device body in a fourth exemplary embodiment of the present invention.
Figure 12B:
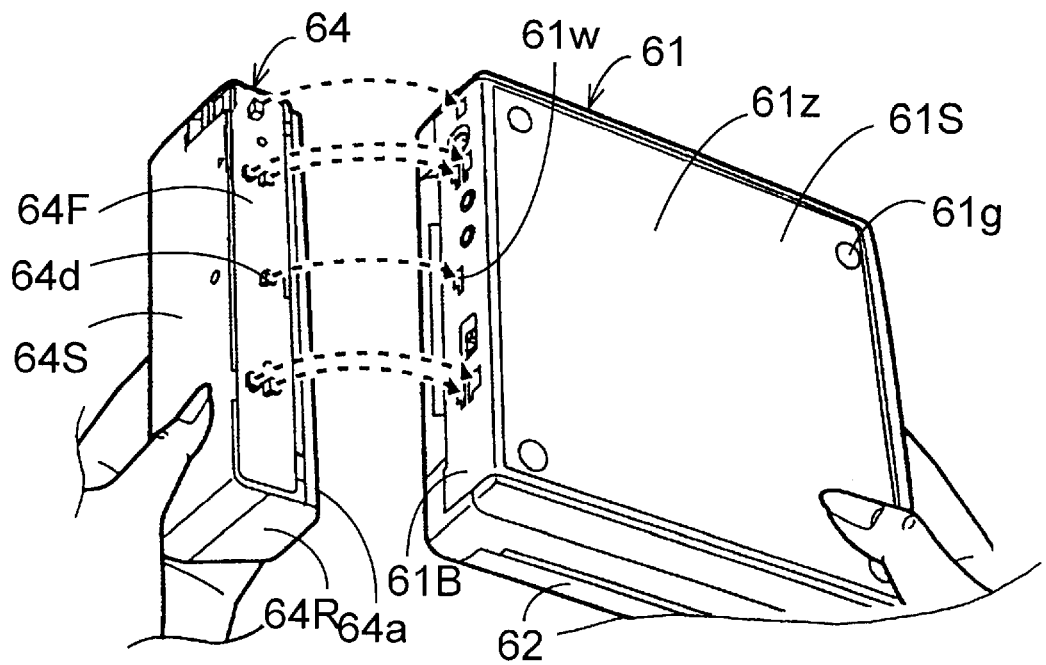
FIG. 12B is a perspective view showing structure how the sub-device is attached to the device body in the fourth exemplary embodiment of the present invention.

Hereinafter an audio-video playback device of a fourth exemplary embodiment of the present invention is described referring to FIGS. 12A and 12B. In FIGS. 12A and 12B, an device body 61, a monitor portion 62 and rotatably supporting portions 63 are the same as those described in the first exemplary embodiment. A battery portion 64 comprises rechargeable batteries 64b contained in a case 64a. As shown in FIG. 12B, the battery portion 64 is solidly connected to the device body 61 in the manner that the locking hooks 64d disposed on the front side 64F of the case 64a slide into holes 61w disposed on the back side 61B of the device body 61. In FIG. 12A, a third side, i.e. the right side 64R of the case 64a is formed to be substantially on a same plane with the right side 61R of the device body 61 or to be slightly inner position from a plane formed by the right side 61R in the state that the battery portion 64 is solidly attached to the device body 61. The bottom side 64S is also formed to be substantially on a same plane with the bottom side 61S of the device body 61 or to be slightly inner position from the plane. Electric power is supplied by connecting a power source line 64c disposed on the left side 64L of the case 64a to a power source terminal 61p of the audio-video playback device. The rechargeable batteries 64b are charged by connecting AC adapter (not illustrated) of recharge power source to a electric power input terminal 64e. As shown in partially cross sectional illustration in FIG. 62A, the power source line 64c and the electric power input terminal 64e are disposed at the left side 64L of the case 64a, therefore the rechargeable batteries are contained toward the right side in the case 64a.

The operation of the audio-video playback device having the above structure is described hereinafter. The device that receives power from the battery portion 64 reproduces images and sounds of a disk (not illustrated) in the ordinary setting of the device as in the case of the first exemplary embodiment. The stable side-down setting in the manner that both right sides 61R and 64R face downward is also realized. Since the heavy rechargeable batteries 64b locates toward the right side 64R as in the location of the mechanism (not illustrated) in the device body 61, the gravity center of the battery portion 64 also locates toward the right side. Accordingly the stability of the side-down setting increases. However the stability in the side-down setting does is not so much different between the state that the battery portion 64 is attached to the device body 61 and the state that the battery portion is separated, because, in the state of side-down setting, the resultant force of the gravity centers of the device body 61 and the battery portion 64 drops down inside the area of the right side 61R of the device body or the right side 64R of the battery portion 64 when the battery portion 64 is attached to the back side 61B, and the gravity center drops down inside the area of the right side 61R of the device body 61 when the battery portion 64 is separated.

In this exemplary embodiment as described above, the battery portion 64 is solidly attachable to the device body 61, and the gravity center of the battery portion 64 locates toward the right side 64R, also the right side 64R of the battery portion 64 and the right side 61R of the device body 61 are substantially on a same plane when the battery portion 64 is solidly attached to the device body 61, accordingly audio and video playback can be performed by using the electric power of the battery portion 64, also, the stable ordinary setting and the side-down setting is realized.

In the above description, the rechargeable batteries 64b are enclosed in the case 64a. However, the same effect can be obtained when the battery portion 64 is formed in the manner that exchangeable dry batteries are contained toward the right side in an openable case.

In the above description of this exemplary embodiment, the power supply from the battery portion 64 to the device body 61 is performed by connecting the power supply line 64c located in the left side 64L to the power source terminal 61p located in the left side 61L. However, the power supply can also be performed through electrodes formed on the back side 61B of the device body 61 and on the front side 64F of the battery portion 64. In this case, it is recommendable to form the device in a manner so that the electrodes become conductive to each other when the battery portion 64 is solidly attached to the device body 61 by inserting the locking hooks 64d into the holes 61w. In this case, it is desirable that the electrodes are formed at both left ends of the back side 61B and the front side 64F so that the rechargeable batteries are easily disposed toward the right side in the case 64a.

In the above description of this exemplary embodiment, the battery portion (such as a so called a battery pack comprising rechargeable batteries or dry batteries) is described as an example of sub-device. However, the sub-device is not limited to this. It can be an interface portion for outputting audio-video signals for a computer, a tuner portion for outputting signals for displaying images by a monitor and outputting sounds by speakers based on TV broadcast signals, or a global positioning system (GPS) that judges geographical position based on the data of a topographical map CD-ROM (compact disk of read only memory) and geographical position signals from an orbiter and outputs signals for displaying the geographical position by the monitor portion of the device. In the case of the GPS, automatic correction of the location signals can be performed by the setting state detection systems described in the following fifth exemplary embodiment.

Fifth Exemplary Embodiment

Hereinafter an audio-video playback device of a fifth exemplary embodiment of the present invention is described referring to FIG. 13A, FIG. 13B and FIG. 14. In the first exemplary embodiment, the right side of the device faces downward in the side-down setting of the device, accordingly a user can watch natural playback images and can listen to natural playback sounds when the user lies down so that the right side of the head faces downward. However, as shown in FIG. 14, when the user turns so that the left side of the head faces downward, the display images appear upside-down or left-right reversed, and sounds are left-right reversed. Accordingly, the user may feel discomfort. This problem is addressed by allowing the user to change display images and sounds from speakers or the headphone according to head position by operating switches to the side-down setting of the devices.

Figure 3:
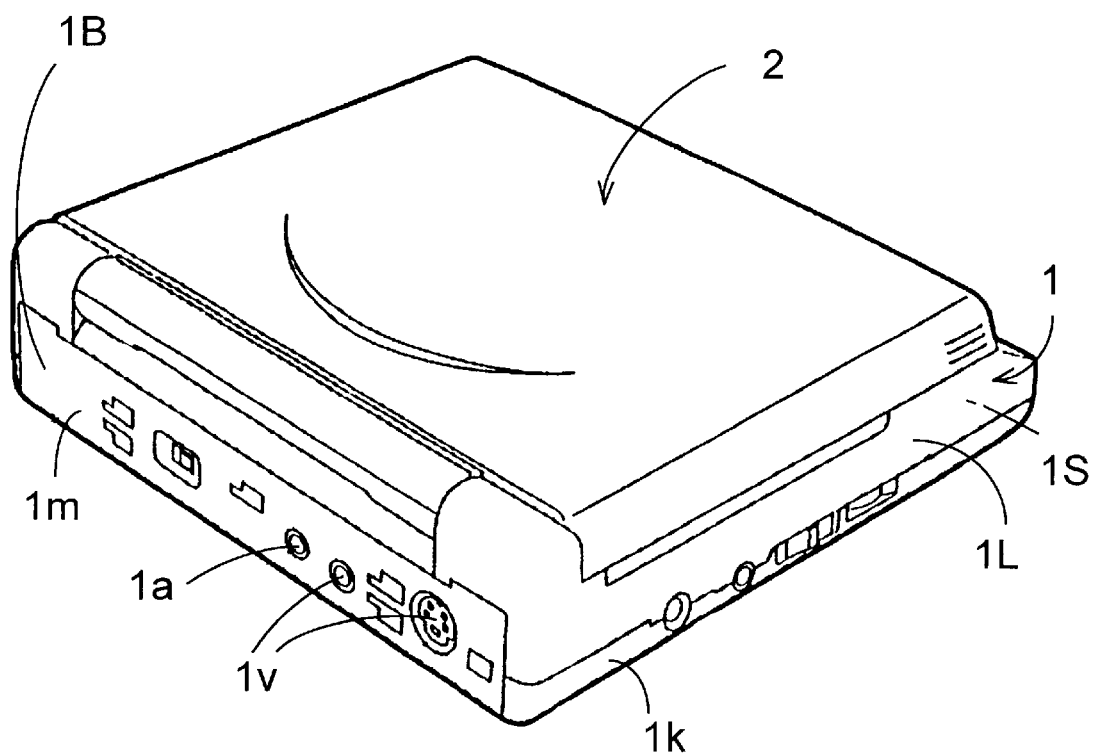
FIG. 3 is a perspective view showing the structure of the audio-video playback device in the first exemplary embodiment of the present invention, in the state that the monitor portion is closed over the device body, seen from the left-back of the device.
Figure 13A:
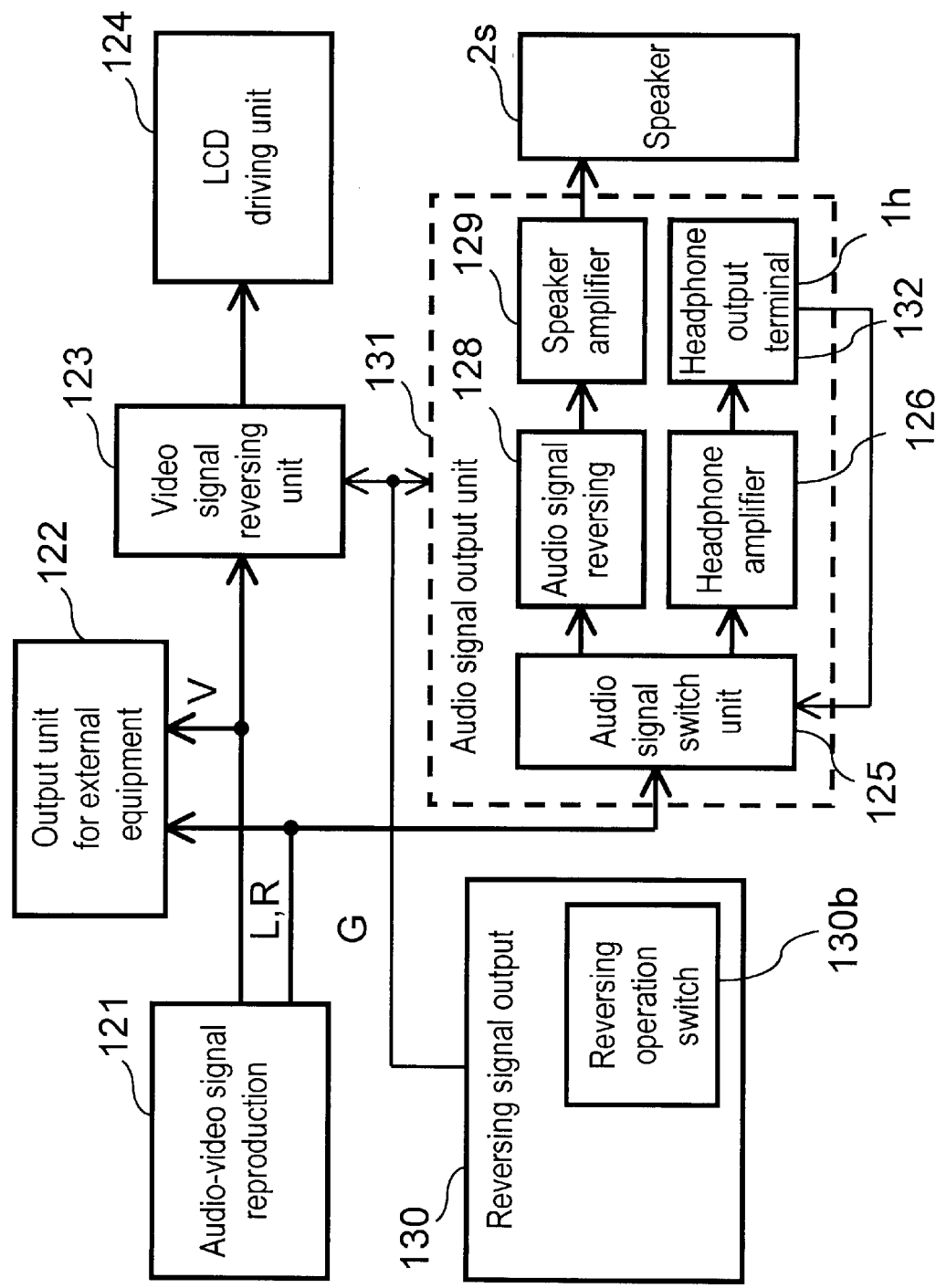
FIG. 13A is a block diagram showing a structure of an audio-video playback device of a fifth exemplary embodiment of the present invention.

FIG. 13A is a block diagram showing the structure of this exemplary embodiment. In FIG. 13A, an audio-video signal reproduction unit 121 detects and demodulates the data recorded in a disk (not illustrated) by a light beam and outputs video signals V, left audio signals L and right audio signals R. These signals are inputted into an output unit 122 for an external device and are outputted from the audio signal output terminal 1a and the video signal output terminal 1v disposed on the back side 1B of the device body in the first exemplary embodiment (ref. FIG. 3). The video signals V are inputted into a video signal reversing unit 123, then the video signal reversing unit 123 outputs ordinary video signals when the reversing instruction signal G of a reversing signal output unit 130 is Off, or signals of upside down and left-right reversed when the reversing instruction signal G of the reversing signal output unit 130 is On, to an LCD driving unit 124. In general, in a display of an LCD, the image reversing of upside down and left to right can be easily performed by reversing signal output of column of horizontal direction and row of vertical direction respectively. The image reversing on the LCD 2m can be performed by this method.

Next, an audio signal output unit 131 comprises an audio signal switching unit 125, an audio signal reversing unit 128, a speaker amplifier 129, a headphone amplifier 126 and a headphone output terminal 132. The left and the right audio signals L and R flow either into an audio signal reversing unit 128 or into a headphone amplifier 126 through the audio signal switching unit 125. When the headphone plug P (not illustrated) of the headphone output terminal 132 is connected to the headphone terminal 1h, the left and the right audio signals L and R are switched by the audio signal switching unit 125 to flow into a headphone amplifier 126 and are amplified by the amplifier 126 without being reversed left to right and the sounds come out from the headphone (not illustrated) without being reversed.

When the headphone plug P is not connected to the headphone terminal 1h, the left and the right audio signals L and R are inputted into the speaker amplifier 129 through the audio signal reversing unit 128, and sounds come out from stereo speakers 2s disposed on monitor portion 2 (ref. FIG. 14). The audio signal reversing unit 128 also, as in the case of the video signal reversing unit 123, outputs ordinary audio signals when the reversing instruction signal G is Off, or audio signals of left-right reversed when the reversing instruction G is On.

In the above structure, sounds from speakers 2s can be reversed left to right according to display images which are upside down and left-right reversed, while the sounds from the headphone are not reversed even when the display images are reversed and a user can listen to ordinary sounds from the headphone. Accordingly the user need not reverse the headphone.

The following is an explanation on a reversing signal output unit 130 that outputs reversing instruction signal G. The reversing signal output unit 130 comprises a reversing operation switch 130b, and by operating the switch 130b, the reversing instruction signal G that comes out from the reversing signal output unit 130 becomes On. The reversing operation switch 130b is one of the operation switches and it works by the operation of a user, i.e., when the user lies down so that the left side of the head faces downward and the user wants to use the audio-video playback device in the state of side-down setting, the user can enjoy ordinary playback images and sounds by switching the reversing instruction signal G to On by turning the reversing operation switch 130b to On, by which the display images become upside down and left-right reversed and the sounds from the speakers are left-right reversed.

FIG. 13B is another block diagram showing the structure of this exemplary embodiment. The reversing signal output unit 130 comprises a side-down setting detection unit 130a and the reversing operation switch 130b. The side-down setting detection unit 130a automatically detects the state of side-down for the device body, The other configuration in FIG. 13B is the same as in FIG. 13A. In the above reversing instruction signal G, the output of an erroneous signal can be prevented if the reversing operation switch 130b is configured to work only when the side-down setting detection unit 130a detects the side-down setting. The images and sounds are not reversed even when the operation switch 130b is operated by mistake in the state of the ordinary setting of the device.

Hereinafter three examples for the side-down setting detection unit 130a are described. The first example is to dispose on the right side 1R (ref. FIG. 2) of the device body 1 a small knob of a momentary switch that works by small pushing power, or an optical sensor that works as switch when the outer light is intercepted by side-down setting of the device.

Figure 15:
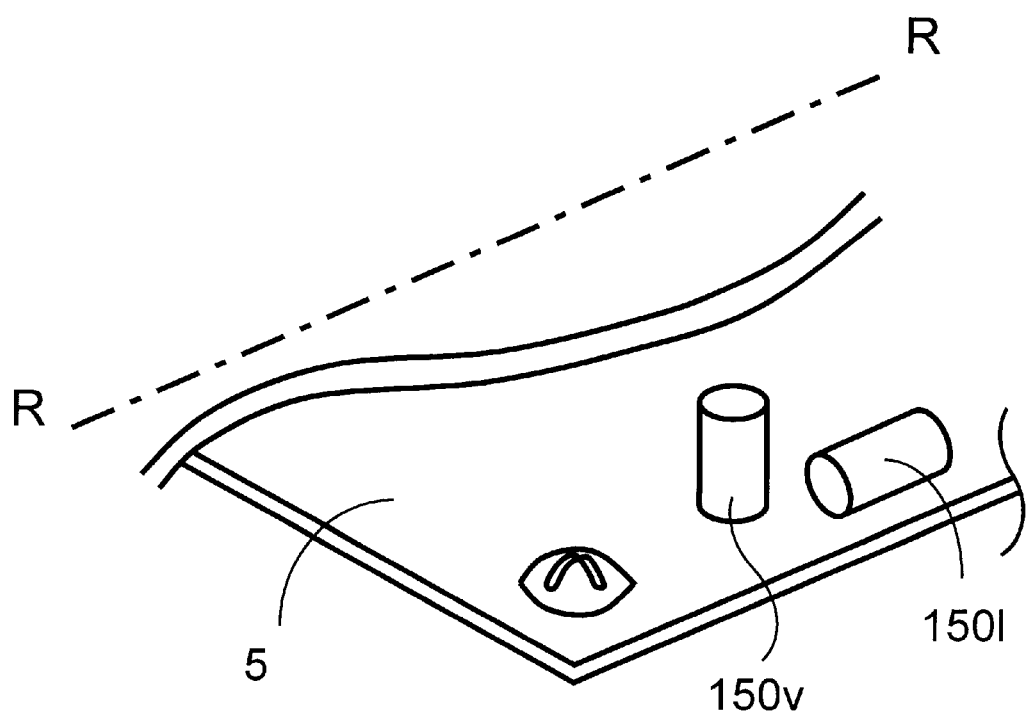
FIG. 15 is a perspective view showing a second example of side-down setting detection units in the fifth exemplary embodiment of the present invention.
Figure 16:
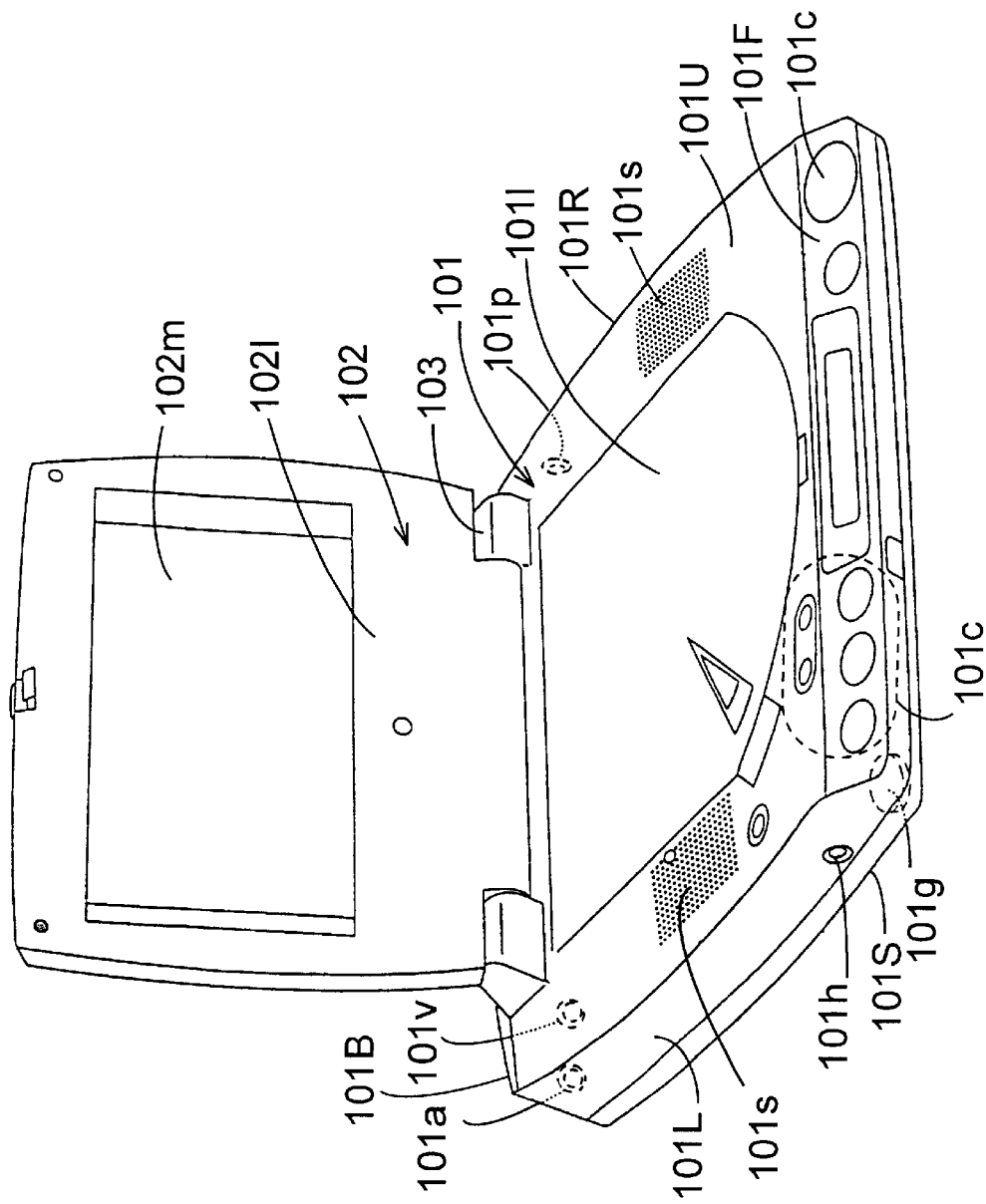
FIG. 16 is perspective view showing the structure of a conventional audio-video playback device.

The second example is to use a gravity sensor that detects the direction of the sensor by the method that a small metal ball rolls inside the small tube. As shown in FIG. 15, one sensor 31h is attached on the PWB 5 in such manner as to be lying in parallel with the PWB 5 along substantially same direction with the rotation axis, and another sensor 31v is attached on the PWB 5 substantially vertically to the PWB 5. In this structure, the ordinary setting or the side-down setting, i.e., the horizontal setting or vertical setting of the device can be detected by detecting the standing or lying direction of the PWB 5.

The third example is to detect the side-down setting by detecting the driving current of the mechanism 4. As shown in FIG. 5, the mechanism 4 described in the first exemplary embodiment is disposed toward the right side 1R of the device body 1 for locating the gravity center toward the right side 1R. Accordingly the traverse portion 4c that moves the pickup 4b along the direction of the disk diameter is disposed toward the right side 1R from around the center line C-C of the device body 1, accordingly the pickup 4b is also formed in such manner as to move between the place around the center line C-C and the right side 1R. In this structure, the loading current for the driving motor of the traverse portion 4c for moving the pickup 4b does not change when the pickup 4b is moved toward the inner and the outer circumferences of a disk horizontally along the diameter direction of the disk in the ordinary setting of the device body 1. On the other hand, in the state of the side-down setting of the device body 1, the loading current for the driving motor of the traverse portion 4c for moving the pickup portion 4b is largely different between the occasion that the pickup portions 4b is moved toward the outer circumference side of the disk along gravity and the occasion that the pickup portion 4c is moved toward the inner circumference side of the disk against the gravity. Therefore, by detecting the difference of the loading current, the setting state of the device can be detected, and the automatic detection of the side-down setting can be thus realized. Especially in the case of recording and playback by the DVD, different from an ordinary audio CD, the small inward and outward move of the pickup 4b is performed very often, accordingly the setting state can be detected even during the running of playback. In general, the loading current for the motor for driving the traverse portion 4c and the loading current for the spindle motor for the spindle portion 4a for rotating the disk in high speed are always detected by microcomputer for the servo-control of these motors. Therefore, by changing the program of the microcomputer for the above detection, the detecting system can be formed very economically.

Furthermore, the vibration components of the traverse driving current, in which the vibration is caused by the shock or vibration of the device body 1 by external force, can be compensated by detecting the low frequency components of the loading current of the spindle motor rotating in high speed. Since the disk is rotating in the manner of non-contact in the case of playback by a light beam, the loading current for the spindle motor is stable especially in low frequency. Even in the case that the loading current becomes slightly uneven at the higher frequency than the rotation cycle of the disk when the disk largely sways, the low frequency components stays substantially even. Therefore, when the disorder of the low frequency components occurs, it is deemed that the disorder is caused by the shock or vibration of the audio-video playback device 1 by external force. Accordingly, by compensating the vibration components of the traverse driving current deeming that the vibration is caused by the shock or vibration of the device by external force, more precise detection is realized.

By using the method of detecting the change of the driving current of the mechanism portion as described in the above third example for detecting the side-down setting, an inexpensive and sure automatic detection system is realized, and, the reversing of images and sounds in the fourth exemplary embodiment is also realized by using this method.

There is another exemplary method for detecting the side-down setting of the device. For example, by detecting the change of the driving state of the focus lens of the pickup, the setting state of the device can be detected.

Also, in this exemplary embodiment, amplifiers are respectively disposed for the speakers and the headphone for amplifying the sounds suitable for the respective characteristics, and it is formed in such manner as to be usable for reproducing the left and the right sub-sounds or heavy low sounds signals for external audio DVD. However, it can be the one that one amplifier amplifies the audio signals of the audio-video signals first, then the audio signals are inputted to the audio signal reversing unit through a headphone terminal having a switching function, i.e., when the headphone is not connected, the signals suitable for a speaker flows, and when the headphone is connected, the signals suitable for a headphone flows. In this structure also, signals for the speaker is cut when the headphone is connected to the headphone terminal, and the ordinary sounds come out from the headphone. On the other hand, when the audio signals are inputted to the audio signal reversing unit through the headphone terminal, the audio signals are inputted only to speakers and the sounds can be reversed. In this case, the amplifier is commonly used for the speakers and the headphone, accordingly less expensive equipment can be formed.

In all of the above exemplary embodiments, i.e., in the first through the fifth exemplary embodiments, the examples of the audio-video playback device of an optical disk for a recording and playback medium are described. However, the same effect can be obtained on the playback of a magnetic tape for the recording and playback medium. In this case, the detection of the side-down setting of the device can be performed by detecting the driving current difference for the rotating drum head of the playback device as is done in the third exemplary embodiment.

Also, in the above first and second exemplary embodiments, the examples of the side-down setting in the manner that the right sides 1R and 2R of the device body 1 and the monitor portion 2 face the downward are described. However, for the convenience of a user who lays himself or herself in the manner that the left side of his or her head faces downward, the side-down setting in the manner that the left sides 1L and 2L of the device body 1 and the monitor portion 2 face downward can be realized by forming in the manner that both left sides 1L and 2L of the device body 1 and the monitor portion 2 are on a substantially same plane and the plane is substantially vertical to the rotation axis R-R of the rotatably supporting portions 3, and, disposing switches and terminals on the right side 1R only, also, disposing the mechanism 4 toward the left side 1L of the device body 1 so that the gravity center locates toward the left side 1L of the device body 1. In that case, when a user lays down in the manner that the left side of his head faces downward, his right hand becomes free for operating the device. Accordingly the side-down setting in the manner that the left side of the device faces downward is convenient for a right-handed person.

Also, in the first through the fourth exemplary embodiments, the examples in which the width of the monitor portion is substantially the same with that of the device body are described. However, the same effect can be obtained when only one side of the device body (right sides in the exemplary embodiments), on which the operation switches, the headphone output terminal and the other input and output terminals are not disposed, is formed to be on a substantially the same plane with that of the monitor portion. In the above exemplary embodiments, the audio-video playback device has the rotatably supporting portions at around the back end of the device body and the monitor portion is opened by rotating in an obtuse angle (more than 90-degree) on the rotation axis when the display images are watched. In this type, the display side of the monitor portion can be closed for protecting from occurrence of scratches and sticking of dust. On the other hand, there is a type in which the rotatably supporting portions are disposed at around the front end of the device body and the display side is always exposed. In this type also the stable side-down setting of the device is realized by rotating the monitor portion in an acute angle (less than 90-degree) on the rotation axis.

Also, in the above all exemplary embodiments, i.e., in the first through fifth exemplary embodiments, the examples of audio-video device for playback only are described. However, the same effect can be obtained on the device having recording and playback if the device has at least the function of playback.

As described above, the following effects are obtainable by the present invention.

In the present invention, the first side of the device body and the same side of the monitor portion are on the same plane that is substantially vertical to the rotation axis, and the gravity center of the device body locates toward the first side of the device body. Accordingly very stable setting of the device in the manner that the first side faces downward (side-down setting) in the state that the monitor portion is opened by rotating the monitor portion on the rotation axis can be realized, as in the case of ordinary setting in the manner that the bottom side of the device body faces downward, also, video playback can be performed in the state that either of the length side or the width side of the display area of the display unit comes to the down side.

Also, in the present invention, on the first side of the device body and the second side of the monitor portion, terminals such as power source terminal and headphone terminal, and operation switches such as power source switch and operation switches for playback are not disposed and the gravity center of the device body locates toward the first side of the device body. Accordingly the stable side-down setting of the device as in the case of the ordinary setting is realized, and the operation of the audio-video playback device can be performed in the state of side-down setting, also, the operation of switches can be performed in the state that either of the length side or the width side of the display area of the display unit comes to the down side.

Also, in the present invention, the gravity center of the sub-device such as battery portion containing rechargeable batteries or dry batteries is located toward the third side, and the sub-device is solidly attached to the backside of the device body. Accordingly more stable side-down setting is realized because the gravity centers of the device body and the sub-device locate respectively toward the first side and the third side and the gravity of both drops down within the areas of the first and the third sides.

Also, speakers that output sounds according to audio signals inputted from the device body are disposed on the monitor portion, at the positions close to the rotation axis, between the display area of the monitor portion and the rotation axis. Accordingly, the speakers can be set in such a manner as to face the user of the device so that the user can enjoy natural playback sounds. Also, the torque caused by the speakers to rotate the monitor portion can be reduced, whereby the stress on the rotatably supporting portions can be reduced.

Also, in the present invention, the display images and sounds can be reversed by the operation of the user of the device or a side-down setting detection unit. Accordingly the user can watch natural images and can listen to natural sounds when the user lies down so that either side of the head faces downward in the state of side-down setting of the device in the manner that either of the left side or the right side of the device body faces downward.

What is claimed is:

1. An audio video playback apparatus, comprising:
   a body for reproducing audio and video signals; and
   a display unit, including a display, rotatably attached to said body along a rotation axis;
   said body and said display unit each having a side surface situated substantially in a common plane which is orthogonal to said rotation axis;
   said body having a center of gravity situated closer to said side surface of said body than to an opposite side surface of said body.

2. An audio video playback apparatus according to claim 1, wherein said side surface of said body and said side surface of said display unit are substantially planar.

3. An audio video playback apparatus according to claim 1, wherein said side surface of said body and said side surface of said display unit each include protrusions, each respective surface of said protrusions substantially situated in said common plane.

4. An audio video playback apparatus according to claim 3, wherein at least one of said protrusions is at least a portion of a switch.

5. An audio video playback apparatus according to claim 1, wherein at least one of said side surface of said body and said side surface of said display unit are curved.

6. An audio video playback apparatus according to claim 1, wherein said surface of said body and said display unit are both one of a right side and a left side of said audio video playback apparatus.

7. An audio video playback apparatus according to claim 1, further including a switch for controlling said audio video playback apparatus and a terminal from which at least one of said audio and video signals are obtained;
   wherein said switch and said terminal are situated away from said side surface of said body.

8. An audio video playback apparatus according to claim 1, wherein said display includes at least a speaker situated between said display unit and said rotation axis.

9. An audio video playback apparatus according to claim 1, further comprising left and right speakers situated between said display and said rotation axis further comprising audio reversing means for left-right reversing audio signals emanating from said left and right speakers.

10. An audio video playback apparatus according to claim 9, further comprising a reversing switch coupled to said audio reversing means;
    said audio reversing means left-right reversing sound emanating from said speakers responsive to actuation of said switch.

11. An audio video playback apparatus according to claim 10, further comprising a reversing switch coupled to said video reversing means;
    said video reversing means modifying said video signals so that image appears upside down on said display responsive to actuation of said switch.

12. An audio video playback apparatus according to claim 9, further comprising a gravity actuated switch;
    said gravity actuated switch coupled to said audio reversing means, wherein orientation of said audio video playback apparatus into one of a plurality of positions results in actuation of said gravity switch;
    wherein said audio reversing means left-right reverses said audio signals responsive to actuation of said gravity switch.

13. An audio video playback apparatus according to claim 9, further comprising a gravity actuated switch coupled to said video reversing means, wherein orientation of said audio video playback apparatus into one of a plurality of positions results in actuation of said gravity switch;
    wherein said video reversing means modifying said video signals so that said image appears upside down on said display responsive to actuation of said gravity switch.

14. An audio video playback apparatus according to claim 9, further comprising a mechanism for driving a playback medium wherein orienting said audio video playback apparatus into one of a plurality of orientations results in a change in driving current of said mechanism;
    said audio reversing means actuated responsive to said change in driving current.

15. An audio video playback apparatus according to claim 9, wherein said mechanism includes a pickup portion for detecting data from a playback medium, wherein orientating said audio video playback apparatus into one of a plurality of orientations results in a change in a driving state of a focus lens of said pickup portion, said audio reverse means actuated responsive to said change of said driving state.

16. An audio video playback apparatus according to claim 1, further comprising a video reversing means for modifying said video signals so that a resulting video image appears upside down on said display.

17. An audio video playback apparatus according to claim 16, further comprising a reversing switch coupled to said video reversing means;

said video reversing means modifying said video signals so that said image appears upside down on said display responsive to actuation of said switch.

18. An audio-video playback apparatus according to claim 1, further comprising a sub-apparatus having a front side solidly attachable to the back side of said apparatus body, wherein a third side out of the left and the right side of said sub-apparatus and said first side of said apparatus body forms a substantially same plane, or, said third side locates at a position inner than a plane formed by said first side, wherein said third side locates at the same side with said first side.

19. An audio-video playback device comprising:

(a) reversing signal output means for outputting a reversing instruction signal for reversing an image to an upside down position, and for reversing sound left to right;

(b) an audio-video signal reproduction means for reproducing a stored video signal and left and right stored audio signals;

(c) a video signal reversing means for causing an image corresponding to said stored video signal to appear upside down;

(d) audio signal output means for causing sound corresponding to said left and right stored audio signals to be left-right reversed; and a gravity actuated reverse switch, wherein said video signal reversing means causes said image to appear upside down and said audio signal output means causes said sound to be left-right reversed responsive to operation of said reverse switch.

20. An audio-video playback device according to claim 19, further including left-right speakers wherein said sound is outputted on headphones, and output of sound is initiated on said left-right speakers when said headphones are disconnected from audio-video playback device.

21. An audio-video playback device according to claim 19, wherein said reverse switch is also user actuated.

* * * * *

UNITED STATES PATENT AND TRADEMARK OFFICE
CERTIFICATE OF CORRECTION

PATENT NO. : 6,704,495 B1  Page 1 of 1
DATED : March 9, 2004
INVENTOR(S) : Kumazawa et al.

It is certified that error appears in the above-identified patent and that said Letters Patent is hereby corrected as shown below:

<u>Column 16,</u>
Line 8, "display includes" should read -- display unit includes --.
Line 9, "display unit and" should read -- display and --.

Signed and Sealed this

Twenty-fifth Day of April, 2006

JON W. DUDAS
*Director of the United States Patent and Trademark Office*